United States Patent
Mansfield et al.

(10) Patent No.: US 9,569,555 B2
(45) Date of Patent: *Feb. 14, 2017

(54) METHOD FOR ADDING A USER-SELECTABLE FUNCTION TO A HYPERLINK

(75) Inventors: Steve Mansfield, Lexington-Fayette, KY (US); Patrick Hanna, Lexington-Fayette, KY (US)

(73) Assignee: GOOGLE INC., Mountain View, CA (US)

( * ) Notice: Subject to any disclaimer, the term of this patent is extended or adjusted under 35 U.S.C. 154(b) by 2473 days.

This patent is subject to a terminal disclaimer.

(21) Appl. No.: 11/040,390

(22) Filed: Jan. 21, 2005

(65) Prior Publication Data

US 2005/0259120 A1 Nov. 24, 2005

Related U.S. Application Data

(63) Continuation of application No. 10/503,205, filed as application No. PCT/US03/02876 on Jan. 31, 2003, now abandoned, application No. 11/040,390, which is a continuation-in-part of application No. 09/847,999, filed on May 4, 2001, now Pat. No. 7,076,743, which is a continuation-in-part of application No. 09/594,786, filed on Jun. 16, 2000, now Pat. No. 6,925,496.

(60) Provisional application No. 60/352,591, filed on Jan. 31, 2002, provisional application No. 60/202,029, filed on May 4, 2000, provisional application No. 60/277,279, filed on Mar. 21, 2001, provisional application No. 60/283,142, filed on Apr. 12, 2001.

(51) Int. Cl.
*G06F 17/30* (2006.01)
*G06F 3/0481* (2013.01)

(52) U.S. Cl.
CPC ..... *G06F 17/30899* (2013.01); *G06F 3/04812* (2013.01)

(58) Field of Classification Search
USPC .......................... 707/100–102; 715/206–208
See application file for complete search history.

(56) References Cited

U.S. PATENT DOCUMENTS

| 5,446,891 A | 8/1995 | Kaplan et al. |
| 5,462,065 A | 10/1995 | Cusimano |
| 5,515,496 A | 5/1996 | Kaehler et al. |

(Continued)

FOREIGN PATENT DOCUMENTS

| WO | WO-98/54637 | 12/1998 |
| WO | WO 99/61976 A | 12/1999 |
| WO | WO 03/065167 A2 * | 8/2003 |

OTHER PUBLICATIONS

International Search Report for related application PCT/US01/11751.

(Continued)

*Primary Examiner* — Khanh Pham
(74) *Attorney, Agent, or Firm* — Middleton Reutlinger

(57) ABSTRACT

A multifunction hyperlink and method for providing an multifunction hyperlink are provided. This invention permits the user to interact with a hyperlink in a variety of ways without necessarily having to open and/or follow the hyperlink. This is accomplished by detecting the presence of a cursor near a hyperlink. After detecting the hyperlink, a toolbar is displayed containing one or more link functions that the user may select. In response to the users' selection of a particular link function, that link function would be performed without requiring any further action by the user.

42 Claims, 15 Drawing Sheets

(56) References Cited

U.S. PATENT DOCUMENTS

| | | |
|---|---|---|
| 5,603,025 A | 2/1997 | Tabb et al. |
| 5,694,561 A | 12/1997 | Malamud et al. |
| 5,708,825 A | 1/1998 | Sotomayor |
| 5,742,768 A | 4/1998 | Gennaro et al. |
| 5,745,360 A | 4/1998 | Leone et al. |
| 5,745,376 A | 4/1998 | Battiloro et al. |
| 5,761,436 A | 6/1998 | Nielsen |
| 5,774,660 A | 6/1998 | Liu et al. |
| 5,787,416 A | 7/1998 | Tabb et al. |
| 5,794,257 A | 8/1998 | Liu et al. |
| 5,802,299 A | 9/1998 | Logan et al. |
| 5,806,077 A | 9/1998 | Wecker |
| 5,809,250 A | 9/1998 | Kisor |
| 5,809,317 A | 9/1998 | Kogan et al. |
| 5,838,317 A | 11/1998 | Bolnick et al. |
| 5,855,015 A | 12/1998 | Shoham |
| 5,870,767 A | 2/1999 | Kraft, IV |
| 5,885,231 A | 3/1999 | Cramer et al. |
| 5,898,836 A | 4/1999 | Noble et al. |
| 5,914,714 A | 6/1999 | Brown |
| 5,917,491 A | 6/1999 | Bauersfeld |
| 5,920,859 A | 7/1999 | Li |
| 5,931,912 A | 8/1999 | Wu et al. |
| 5,964,719 A | 10/1999 | Costello et al. |
| 5,968,125 A | 10/1999 | Garrick et al. |
| 5,978,848 A | 11/1999 | Maddalozzo, Jr. et al. |
| 5,982,445 A | 11/1999 | Eyer et al. |
| 5,983,244 A | 11/1999 | Nation |
| 5,995,102 A | 11/1999 | Rosen et al. |
| 5,995,756 A | 11/1999 | Hermann |
| 6,014,678 A | 1/2000 | Inoue et al. |
| 6,018,345 A | 1/2000 | Berstis |
| 6,023,701 A | 2/2000 | Malik et al. |
| 6,025,844 A | 2/2000 | Parsons |
| 6,026,437 A | 2/2000 | Muschett et al. |
| 6,044,384 A | 3/2000 | Ishima et al. |
| 6,044,385 A | 3/2000 | Gross et al. |
| 6,049,326 A | 4/2000 | Beyda et al. |
| 6,061,695 A | 5/2000 | Slivka et al. |
| 6,061,701 A | 5/2000 | Hirai et al. |
| 6,078,935 A | 6/2000 | Nielsen |
| 6,081,815 A | 6/2000 | Spitznagel et al. |
| 6,088,707 A | 7/2000 | Bates et al. |
| 6,091,409 A | 7/2000 | Dickman et al. |
| 6,133,915 A | 10/2000 | Arcuri et al. |
| 6,141,010 A | 10/2000 | Hoyle |
| 6,154,205 A | 11/2000 | Carroll et al. |
| 6,154,752 A | 11/2000 | Ryan |
| 6,161,126 A | 12/2000 | Wies et al. |
| 6,178,419 B1 | 1/2001 | Legh-Smith et al. |
| 6,184,886 B1* | 2/2001 | Bates et al. ............... 715/760 |
| 6,195,097 B1 | 2/2001 | Shrader et al. |
| 6,199,071 B1 | 3/2001 | Nielsen |
| 6,211,874 B1 | 4/2001 | Himmel et al. |
| 6,256,631 B1 | 7/2001 | Malcolm |
| 6,271,840 B1 | 8/2001 | Finseth et al. |
| 6,278,448 B1 | 8/2001 | Brown et al. |
| 6,338,075 B2 | 1/2002 | Fukuda et al. |
| 6,429,880 B2 | 8/2002 | Marcos et al. |
| 6,456,304 B1 | 9/2002 | Angiulo et al. |
| 6,493,000 B1 | 12/2002 | Wynn et al. |
| 6,510,461 B1 | 1/2003 | Nielsen |
| 6,518,983 B1 | 2/2003 | Grohmann et al. |
| 6,563,514 B1 | 5/2003 | Samar |
| 6,563,913 B1* | 5/2003 | Kaghazian ............... 379/93.24 |
| 6,567,830 B1 | 5/2003 | Madduri |
| 6,667,751 B1 | 12/2003 | Wynn et al. |
| 6,732,145 B1 | 5/2004 | Aravamudan et al. |
| 6,763,496 B1 | 7/2004 | Hennings et al. |
| 6,784,900 B1* | 8/2004 | Dobronsky et al. .......... 715/744 |
| 6,820,111 B1* | 11/2004 | Rubin et al. ............... 709/203 |
| 6,834,372 B1 | 12/2004 | Becker et al. |
| 6,848,075 B1 | 1/2005 | Becker et al. |
| 6,864,904 B1 | 3/2005 | Ran et al. |
| 6,892,354 B1 | 5/2005 | Servan-Schreiber et al. |
| 6,925,496 B1 | 8/2005 | Ingram et al. |
| 7,076,743 B2 | 7/2006 | Ingram et al. |
| 7,206,839 B2 | 4/2007 | Ingram et al. |
| 2001/0032220 A1* | 10/2001 | Ven Hoff ............... 707/513 |
| 2001/0038395 A1 | 11/2001 | Holtzblatt et al. |
| 2002/0019837 A1 | 2/2002 | Balnaves |
| 2002/0143826 A1* | 10/2002 | Day et al. ............... 707/526 |
| 2003/0030679 A1 | 2/2003 | Jain |
| 2005/0071776 A1 | 3/2005 | Mansfield et al. |

OTHER PUBLICATIONS

International Preliminary Examination Report for related application PCT/US01/11751.
Microsoft's Homepage, Feb. 28, 2000.
Linux-Hacker.net Homepage, May 10, 2000.
Newfield, et al., "Scratchpad: Mechanisms for Better Navigation in Directed Web Searching", ACM 1998.
Zellweger, et al., "Fluid Links for Informed and Incremental Link Transitions", ACM 1998.
Memorandum Opinion and Order, U.S. District Court for the Eastern District of Kentucky, *iLOR, LLC* v. *Google, Inc.*, Civil Action No. 5:07-CV-109, Doc. 70 (E.D. Ky. Nov. 30, 2007).
Opinion, United States Court of Appeals for the Federal Circuit, *iLOR, LLC* v. *Google, Inc.*, No. 2008-1178 (Fed. Cir. Dec. 11, 2008).
Netscape Navigator v.4.07 browser archive, available at <http://sillydog.org/narchive/ful14.php>.
Brief for Plaintiff-Appellant, United States Court of Appeals for the Federal Circuit, filed Mar. 28, 2008.
Reply Brief for Plaintiff-Appellant, United States Court of Appeals for the Federal Circuit, filed May 29, 2008.
iLOR's Memorandum in Support of its Motion for Preliminary Injunction, United States District Court Eastern District of Kentucky, filed Aug. 27, 2007.
iLOR's Memorandum in Opposition to Defendant Google's Cross-Motion for Summary Judgment, United States District Court Eastern District of Kentucky, filed Nov. 2, 2007.
iLOR's Memorandum in Reply to Defendant Google's Response to Plaintiff iLOR's Motion for Preliminary Injunction, United States District Court Eastern District of Kentucky, filed Nov. 2, 2007.
Wikipedia, Social Software, available at <http://en.wikipedia.org/wiki/Social_software> (accessed Aug. 24, 2007), iLOR's Memorandum in Support of a Preliminary Injunction, Exhibit B.
Tim O'Reilly, What Is Web 2.0—Design Patterns and Business Models for the Next Generation of Software, Sep. 30, 2005, http://www.oreillynet.com/lpt/a/6228 (accessed Aug. 24, 2007), iLOR's Memorandum in Support of a Preliminary Injunction, Exhibit C.
Wikipedia, Danny Sullivan available at http://en.wikipedia.org/wiki/Danny_Sullvan_(technologist) (accessed Aug. 24, 2007), iLOR's Memorandum in Support of a Preliminary Injunction, Exhibit D.
About Search Engine Watch—http://searchenginewatch.com/showPage.html?page=about (accessed Aug. 24, 2007), iLOR's Memorandum in Support of a Preliminary Injunction, Exhibit E.
About Incisive Media—<http://www.incisivemedia.com/public/show_Page.html?page=11338> (accessed Aug. 24, 2007), iLOR's Memorandum in Support of a Preliminary Injunction, Exhibit F.
Danny Sullivan, iLOR Makes Google Even Better, Search Engine Watch (Apr. 19, 2001) available at <http://searchenginewatch.com/2163651/print> (accessed Aug. 24, 2007), iLOR's Memorandum in Support of a Preliminary Injunction, Exhibit G.
About MarketWatch available at <http://www3.marketwatch.com/siteinfo/> (accessed Aug. 24, 2007), iLOR's Memorandum in Support of a Preliminary Injunction, Exhibit H.
Bambi Francisco, Google Going Vertical, Marketwatch (May 11, 2006) available at <http://www.marketwatch.com/News/Story/Story.aspx?guid=%7B174948FEE62F-40E5-846A-4C0948CC45B3%7D> (accessed Aug. 24, 2007), iLOR's Memorandum in Support of a Preliminary Injunction, Exhibit I.
Answers.com, beta: Definition and Much More from Answers.com, Jun. 7, 2004, available at <http://www.answers.com/topic/

(56) References Cited

OTHER PUBLICATIONS betadefinition?cat=technology&print=true> (accessed Aug. 24, 2007), iLOR's Memorandum in Support of a Preliminary Injunction, Exhibit J.
Google Notebook FAQ available at <http://www.google.com/googlenotebook/faq.html> (accessed Aug. 24, 2007), iLOR's Memorandum in Support of a Preliminary Injunction, Exhibit K.
Google Notebook Tour available at <http://www.google.com/googlenotebook/tour1.html> (accessed Aug. 24, 2007), iLOR's Memorandum in Support of a Preliminary Injunction, Exhibit L.
Google Notebook from Google Labs, (May 10, 2006) available at <http://www.google.com/intl/en/press/pressrel/new_tech.html> (accessed Aug. 24, 2007), iLOR's Memorandum in Support of a Preliminary Injunction, Exhibit M.
Whatis.com, Browser (Sep. 25, 2006) available at http://searchvb.techtarget.com/sDefinition/O,,sid8_qci211708,00.html (accessed Aug. 24, 2007), iLOR's Memorandum in Support of a Preliminary Injunction, Exhibit N.
Burt Helm, Google 's Desktop Offensive, Business Week (May 11, 2006) available at <http://www.businessweek.com/print/technology/_content/_may2006/tc20060511_493243.htm> (accessed Aug. 24, 2007), iLOR's Memorandum in Support of a Preliminary Injunction, Exhibit O.
About the Motley Fool available at <http://www.fool.com/Server/printarticle.aspx&file=/press/about.htm> (accessed Aug. 24, 2007), iLOR's Memorandum in Support of a Preliminary Injunction, Exhibit P.
Rick Aristotle Munarriz, Google 's Sticky Little Fingers, The Motley Fool (May 11, 2006) available at <http://www.fool.com!server/printaricle.aspx?fie=/investing/value/2006/05/11/googles-sticky-little-fingers.aspx> (accessed Aug. 24, 2007), iLOR's Memorandum in Support of a Preliminary Injunction, Exhibit Q.
Affdavit of Stephen Manifeld (Aug. 27, 2007), iLOR's Memorandum in Support of a Preliminary Injunction, Exhibit R.
Questions with PreFound.com CEO Steve Manifeld, Reprise Media (May 24, 2006) available at <http://www.searchviews.com/index.php/_archives/2006/05/5-questions- withprefoundcom-ceo-steve-mansfield.phpprint/> (accessed Aug. 24, 2007), iLOR's Memorandum in Support of a Preliminary Injunction, Exhibit S.
About Reprise Media, available at <http://www.reprisemedia.comlabout.aspx> (accessed Aug. 24, 2007), iLOR's Memorandum in Support of a Preliminary Injunction, Exhibit T.
About Susan Kuchinskas, available at <http://kuchinskas.com/aboutus.html> (accessed Aug. 24, 2007), iLOR's Memorandum in Support of a Preliminary Injunction, Exhibit U.
About Us [CMP], available at http://www.cmp.com/about/index.jhtml (accessed Aug. 24, 2007), iLOR's Memorandum in Support of a Preliminary Injunction, Exhibit V.
Susan Kuchinskas, Prefound on Competing with Google, THE 360 (Oct. 27, 2006) available at <http://360techblog.com/prefound-on-competing-with-google/2006/10/27/> (accessed Aug. 24, 2007), iLOR's Memorandum in Support of a Preliminary Injunction, Exhibit W.
Google Goes Multi-Lingual, The Official Google Blog (Mar. 29, 2007) available at <http://googleblog.blogspot.com/2007/03/google-notebook-goesmulti-lingual.html> (accessed Aug. 24, 2007), iLOR's Memorandum in Support of a Preliminary Injunction, Exhibit X.
Manual of Patent Examining Procedure §719 (USPTO, 8th Edition Revision 5, Aug. 2006), iLOR's Memorandum in Support of a Preliminary Injunction, Exhibit Y.
The 360, About the 360, available at <http://360techblog.com/about/> (accessed Aug. 24, 2007), iLOR's Memorandum in Support of a Preliminary Injunction, Exhibit Z.
American Heritage Dictionary (2000) available at <http://www.barleby.com/61/26/A0542600.html> (accessed Aug. 24, 2007), iLOR's Memorandum in Support of a Preliminary Injunction, Exhibit AA.
whatis.com, URL, Nov. 27, 1999, http://web.archive.org/web/20000407183835/http://www.whatis.com/ (accessed Aug. 24, 2007), iLOR's Memorandum in Support of a Preliminary Injunction, Exhibit BB.
Office Action mailed Jan. 28, 2004 (rejecting U.S. Appl. No. 09/594,786), iLOR's Memorandum in Support of a Preliminary Injunction, Exhibit CC.
Response to Jan. 28, 2004, Office Action regarding U.S. Appl. No. 09/594,786, iLOR's Memorandum in Support of a Preliminary Injunction, Exhibit DD.
whatis.com; Plug-in (May 12,2003) available at <http://searchsmb.techtarget.com/Definition/0,,sid44_gci212800,00.html> (accessed Aug. 24, 2007), iLOR's Memorandum in Support of a Preliminary Injunction, Exhibit FF.
whatis.com, Screen Shot (Jul. 31, 2001), available at http://whatis.techtarget.com/definition/0,,sid9gci_497372,00.html (accessed Aug. 24, 2007), iLOR's Memorandum in Support of a Preliminary Injunction, Exhibit GG.
Michael Kanellos Bio available at <http://www.idema.org/smarsite/modules/news/show_news.php?cmd=display&news_id=1393> (accessed Aug. 24, 2007), iLOR's Memorandum in Support of a Preliminary Injunction, Exhibit HH.
Kanellos, The Scary Math Behind Web 2.0 (Apr. 17, 2007) available at <http://news.com.com/8301-10784_3-9710510-7.html?part=rss&subi=news&tag=2547-1_3-0-20> (accessed Aug. 24, 2007), iLOR's Memorandum in Support of a Preliminary Injunction, Exhibit II.
Rich Mieslen, The New York Times Newsroom Navigator, New York Times (Feb. 25, 2007) available at <http://tech.nytimes.com/top/news/technology/cybertimesnavigator/index.html> (accessed Aug. 24, 2007), iLOR's Memorandum in Support of a Preliminary Injunction, Exhibit JJ.
Search of the Google Blog for occurrences of the term "Google Notebook" from Apr. 17, 2007 through Aug. 17, 2007 at http://blogsearch.google.com/blogsearch?as_q=&num=10&hl=en&c2coff=1&as_oq=&as_eg=&lr=&safe=active&q=%22google+notebook%22&ie=UTF-8&as_mind=l7&as_minm=4&as_miny=2007&as_maxd=17&as_maxm=8&as_maxy=2007&as_drrb=b&ctz=240&clcr=4%2F17%2F2007&c2cr=8%2F17%2F2007&btnD=Go (accessed Aug. 24, 2007), iLOR's Memorandum in Support of a Preliminary Injunction, Exhibit KK.
Tom Eid and Nikos Drakos, The Emerging Enterprise Social Software Marketplace (abstract) (Jul. 23, 2007) (search for articles pertaining to social software in <http://www.gartner.com/> (search run Aug. 24, 2007), iLOR's Memorandum in Support of a Preliminary Injunction, Exhibit LL.
Wikipedia, Gartner (Aug. 3, 2007) available at <http://en.wikipedia.org/_wiki/Gartner> (accessed Aug. 24, 2007), iLOR's Memorandum in Support of a Preliminary Injunction, Exhibit MM.
The Kentucky Derby Roundtable (May 5-6, 2006) available at <http://www.prefound.com/roundtable> (accessed Aug. 24, 2007), iLOR's Memorandum in Support of a Preliminary Injunction, Exhibit NN.
Wikipedia, InfoWorld (Apr. 30, 2007) available at http://en.wikipedia.org/wiki/InfoWorld (accessed Aug. 24, 2007), iLOR's Memorandum in Support of a Preliminary Injunction, Exhibit OO.
Elizabeth Montalbano, Prefound.com to Wed Social Networks, Search, Infoworld (Apr. 12, 2006) available at <http://www.infoworld.com/_archives/emailPrint.isp?R=printThis&A=/article/06/04/12/77379_HNprefound_1.html> (accessed Aug. 24, 2007), LOR's Memorandum in Support of a Preliminary Injunction, Exhibit PP.
Nasdaq Summary Quotes, Google, Aug. 24, 2007, http://quotes.nasdaq.com/asp/SummaryQuote.asp?symbol=GOOG&selected=GOOG (accessed Aug. 24, 2007), iLOR's Memorandum in Support of a Preliminary Injunction, Exhibit QQ.
Paul R. LaMonica, What Google should do with its $10 bilion war chest, CNN Money (Apr. 11, 2006) available at <http://money.cnn.com/2006/04/11/ news/companies/googlecash/index.htm> (accessed Aug. 27, 2007), iLOR's Memorandum in Support of a Preliminary Injunction, Exhibit TT.

(56) References Cited

OTHER PUBLICATIONS

Wikipedia, CNN (Aug. 23, 2007) available at http://en.wikipedia.org/wiki/Cnn (accessed Aug. 27, 2007), iLOR's Memorandum in Support of a Preliminary Injunction, Exhibit UU.
Office Action mailed Aug. 15, 2002 (rejecting claims 64-126 of U.S. Appl. No. 09/594,786), iLOR's Memorandum in Opposition to Defendant Google's Cross-Motion for Summary Judgment, Exhibit AAA.
Google Notebook Privacy Policy, available at <http://www.google.com/_googlenotebook/privacy.html> (accessed Nov. 1, 2007), iLOR's Memorandum in Opposition to Defendant Google's Cross-Motion for Summary Judgment, Exhibit WW.
Google Notebook Terms of Service, available at <http://www.google.com/_googlenotebook/terms.html> (accessed Nov. 1, 2007), iLOR's Memorandum in Opposition to Defendant Google's Cross-Motion for Summary Judgment, Exhibit XX.
Reviewer's Guide—Google Notebook from Google Labs, May 2005, iLOR's Memorandum in Opposition to Defendant Google's Cross-Motion for Summary Judgment, Exhibit YY.
Netscape Navigator, adding a bookmark, iLOR's Memorandum in Opposition to Defendant Google's Cross-Motion for Summary Judgment, Exhibit ZZ.
Google, Inc., Form 10-Q, U.S. Securities and Exchange Commission, iLOR's Memorandum in Reply to Defendant Google's Response to Plaintiff iLOR's Motion for Preliminary Injunction, Exhibit 1.
Deposition of Stephen Mansfield, Oct. 9, 2007, iLOR's Memorandum in Reply to Defendant Google's Response to Plaintiff iLOR's Motion for Preliminary Injunction, Exhibit 2.
Declaration of Jimmy Hamilton, Nov. 1, 2007, iLOR's Memorandum in Reply to Defendant Google's Response to Plaintiff iLOR's Motion for Preliminary Injunction, Exhibit 3.
Declaration of Stephen Mansfield, Nov. 1, 2007, iLOR's Memorandum in Reply to Defendant Google's Response to Plaintiff iLOR's Motion for Preliminary Injunction, Exhibit 4.
Unreported Cases used in iLOR's Memorandum in Reply to Defendant Google's Response to Plaintiff iLOR's Motion for Preliminary Injunction.
Web Standards Project entitled "Adding Multimedia in Web Documents" regarding "graphic element," <http://www.webstandards.org/learn/articles/askw3c/jun2004/>, (accessed Oct. 17, 2007).
World Wide Web Consortium (W3C) Web Accessibility Initiative for "Evaluating Text Equivalents" regarding "graphic elements," http://www.w3.org/WAI/EO/2004/07/equivalents.html, (accessed Oct. 17, 2007).
Paul Thurrott, Netscape Communicator 4.07 now available, WINDOW IT PRO, Oct. 5, 1998.
iLOR, Hydralinks, Summary Information, Jun. 13, 2002.
Nicholas Carlson, Searching for the Wisdom of the Crowd, Internetnews.com, Jun. 20, 2006.
Searchviews, 5 Questions with PreFound.com CEO Steve Mansfield, May 24, 2006.
Jessica E. Vascellaro, Tagging helps take pain out of making Internet searches, The Salt Lake Tribune, Feb. 6, 2006.
Jessica E. Vascellaro, The Next Big Thing in Searching, The Wall Street Journal Online, Jan. 24, 2006.
Metamend, New 'Prefound' Search Engine, Jan. 23, 2006.
Chris Sherman, Speed Up Your Searching with Hydralinks, SearchEngineWatch.com, Jun. 19, 2003.
iLOR, Special Insert, Hydralinks a timely soultion for Federal Government technology initiatives.
iLOR, Special Report, Hydralinks a timely solution for Federal Government technology initiatives.
iLOR, University of Kentucky, Hydralinks Software Offers Streamlined Web Searches.
Ask.com Press Center, Ask Jeeves Launches Toolbar for Internet Browsers, Jul. 29, 2002, available at http://ask.mediaroom.com/index.php?s=43&item=366 (accessed Apr. 31, 2009).
J. Murali, Socal Academic-Paper Organiser, The Hindu, Nov. 22, 2004, available at http://www.hindu.com/biz/2004/11/22/stories/2004112200391600.htm (accessed Apr. 31, 2009).
Giles Turnbull, Gathering at the Waterhole, Guardian.co.uk, Jan. 29, 2004, available at http://www.guardian.co.uk/technology/2004/jan/29/weblogs.onlinesupplement (accessed Apr. 31, 2009).
Simpy, Tools for finding things again, Sep. 1, 2004, available at http://www.accessmylibrary.com/coms2/summary_0286-13252157_ITM (accessed Apr. 31, 2009).
Chris Sherman, Everything You Ever Wanted to Know About URL, SearchEngineWatch.com, Aug. 24, 2004, available at http://searchenginewatch.com/3398511 (accessed Apr. 31, 2009).
Stefanie Olsen, Yahoo wants users to get personal with search, CNET News, Oct. 4, 2004, available at http://news.cnet.com/Yahoo-wants-users-to-get-personal-with-search/2100-1025_3-5396222.html (accessed Apr. 31, 2009).
Chris Sherman, iLOR Dumps Google for Ask/Teoma, SearchEngineWatch.com, Feb. 19, 2002, available at http://searchenginewatch.com/2159291 (accessed Apr. 31, 2009).
Danny Sullivan, Search Toolbars & Utilities, Jan. 27, 2004, available at htlp://searchenginewatch.com/2156381 (accessed Apr. 31, 2009).
Richard W. Wiggins, iLOR-Front End Extends Google Functionality, May 28, 2001, available at htto://newsbreaks.infotoday.com/NewsBreaks/iLORFront-End-Extends-Google-Functionality-17586.asp (accessed Apr. 31, 2009).
Dana Blankenhorn, Something New Under the Banner, ClickZ, May 10, 2001, available at http://www.clickz.com/841661 (accessed Apr. 31, 2009).
Jeremy Lockhorn, Pardon Me, Would You Care to View This Ad?, ClickZ, Apr. 15, 2002, available at http://www.clickz.com/1008671 (accessed Apr. 31, 2009).
Bender, G. et al.: "Mouse-Over vs. Point-and-Click: Which is Better?", Jan. 1999, retrieved from the Internet: http://psychology.wichita.edu/surl/usabilitynews/11/pdf/Usability%20News%2011%20-%20Bender.pdf; 1 page.
Brown, M. et al.: "Special Edition Using Netscape 2", ISBN: 0-7897-0612-1, Jan. 1995; 64 pages.
Johnson, Stephanie, Netscape Know-How—Learn why Netscape Navigator 3.0 is rising to the top, Sep. 1996, 6 pages, US.
European Patent Office, Minutes of the Oral Proceedings, Application No. 01930476.5, Nov. 5, 2015, 4 pages, DE.
European Patent Office, Decision to Refuse a European Patent Application, Application No. 01930476.5, Jun. 16, 2010, 11 pages, DE.
European Patent Office, Communication of the Board of Appeal Pursuant to Article 15(1) of the Rules of Procedure of the Boards of Appeal, Jul. 20, 2015, 13 pages, DE.
European Patent Office, Communication—European Search Report, May 10, 2016, DE.

\* cited by examiner

FIG.6
FIG.7
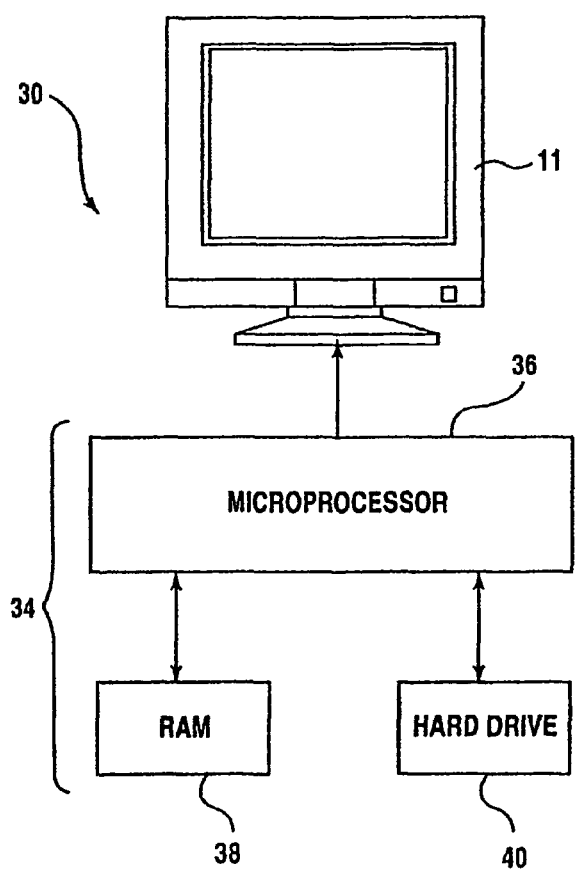
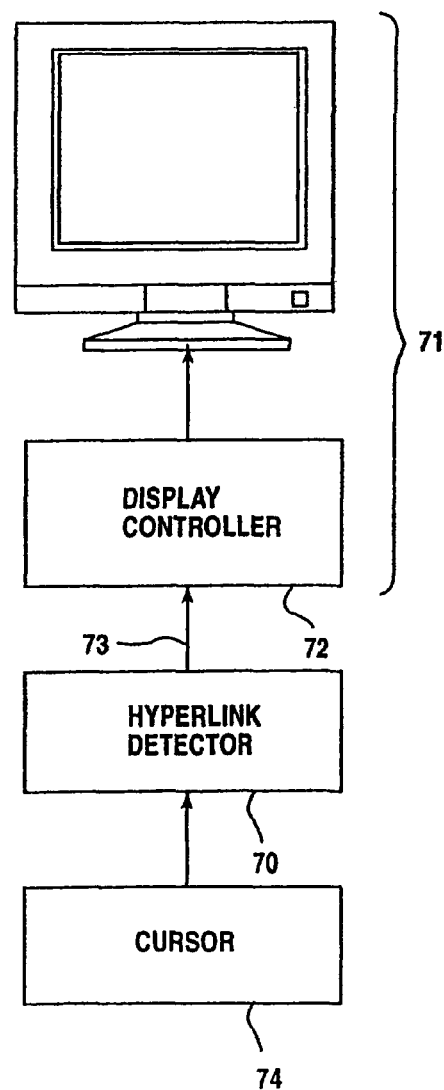

FIG. 10A

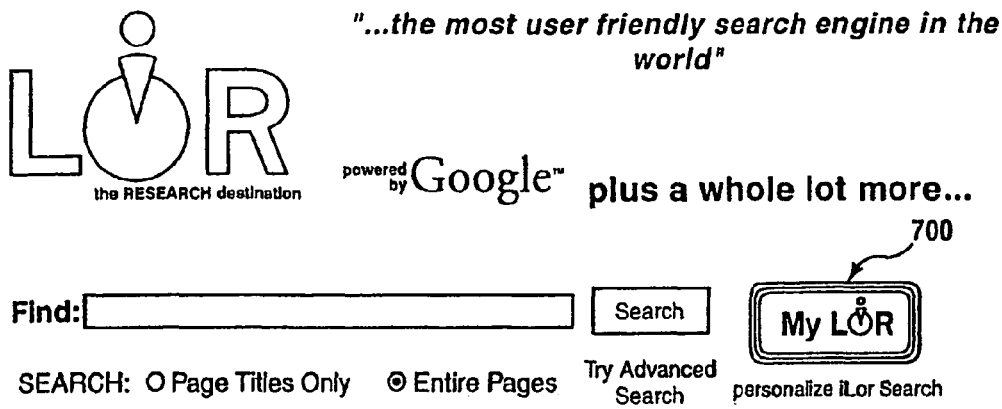

*"...the most user friendly search engine in the world"* plus a whole lot more...

Find: [                    ]  [Search]   [My LOR] — 700

SEARCH:  ○ Page Titles Only   ⊙ Entire Pages   Try Advanced Search   personalize iLor Search iLOR is not just a "search engine".
It is a "Research Engine"!
iLOR Search results have many more options than regular search sites! When you pause your cursor arrow over a search result using iLOR, an option menu appears that gives you exciting, useful and easier ways to explore the results that are relevant to your search and ignore the ones that are not.

- make your web search quick and efficie
- no more clicking the "back" button a million times
- no more running searches over and ove
- pick only the results that are important
- put the best search results in "My List"
- save search results for later use
- explore any result and never get lost

---

Sample Search Results -- See a Demo! (Non-Flash Demo)
(Hold the cursor over a Link to see the LORLinks Menu)

Harold and Maude
Harold and Maude by Colin Higgins Harold Chasen stepped up on the chair and placed the noose about his neck. He pulled it tight and tugged on the knot. It...
Description: The origional text of Harold & Maude. By Colin Higgins.
http://www.eserver.org/filmtv/harold-and-maude.txt-View Page As Searched(101k)- Similar pages - Pages that Link to This Page

Harold and Maude Home Page
> Trivia > Reviews > Links > The Novel > Filming Locations > Guestbook > Reviews
Description: Fansite with information on filming locations, trivia, and merchandise links.
http://www.geocities.com/RainForest/5862/harold.htm - View Page As Searched(3k) - Similiar pages - Pages that Link to This Page

The Documented Harold & Maude Hearse - brought to you by...
... Harold and Maude Merchandise. Harold and Maude DVD, VHS, Books and pictures, sales
help support this site!... Harold (Bud Cort), Harold and Maude ...
http://members.aol.com/dragula59/COOtrue.htm - View Page As Searched

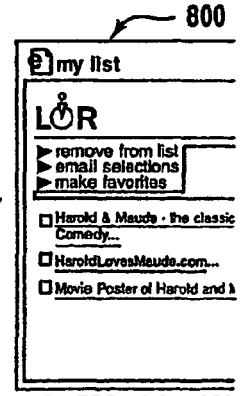 — 800

*Sample "My List" W*
Some features r

*send the results you t might*
*work for you to your "my box"!*

(17k) - Similar pages - Pages that Link to This Page

Harold & Maude Home
This page brought to you by Grimm Rides. harold & Maude Video Box. The
Documented Harold & Maude Hearse. CLICK TO ENTER. 2000.
Description: Everything you wanted to know about the '59 Caddy Hearse used in the cult classic Harold & Maude.
http://members.aol.com/dragula59/HMDoor.htm-View Page As Searched(2k) - Similar pages - Pages that Link to This Page View Page As Searched - If the page has changed since we scanned it, this option will show you the page as it looked when we found your information on it. Other search engines may refer to this as "Cahce".
Similar Pages - this will find more pages like this one.
Pages that Link to This Page - this will show you pages that have hyperlinks to this page.

Get this toolbar for your banner ad
click on it!...it really works!
O check ad later  ) (O check ad now-anchor here ) (O open in new window)   Banner Console

FIG.10B

METHOD FOR ADDING A USER-SELECTABLE FUNCTION TO A HYPERLINK

RELATED APPLICATIONS

The present application is a Continuation of U.S. application Ser. No. 10/503,205, which was the National Stage of International Application No. PCT/US03/02876, filed Jan. 31, 2003, which claims the benefit of U.S. Provisional Application No. 60/352,591, filed Jan. 31, 2002. The present application is a Continuation-in-Part of U.S. application Ser. No. 09/847,999, filed May 4, 2001, which is a Continuation-in-Part of U.S. application Ser. No. 09/594,786, filed Jun. 16, 2000, which claims the benefit of U.S. Provisional Application No. 60/202,029, filed May 4, 2000. U.S. application Ser. No. 09/847,999 claims the benefit of U.S. Provisional Application No. 60/277,279, filed Mar. 21, 2001, U.S. Provisional Application No. 60/283,142, filed Apr. 12, 2001, and U.S. Provisional Application No. 60/202,029, filed May 4, 2000. The entire disclosures of U.S. application Ser. Nos. 09/847,999 and 09/594,786, and U.S. Provisional Application No. 60/202,029 are hereby incorporated by reference.

BACKGROUND OF THE INVENTION

This invention relates to the field of hyperlinks contained in hypertext and computer applications utilizing and producing hypertext containing hyperlinks and more specifically, relates to software that increases the function set of hyperlinks and produces hyperlinks with increased functionality.

DESCRIPTION OF THE RELATED ART

The Internet is a fast growing and important communication medium. One integral and familiar aspect of utilizing the Internet is an application called a "browser". This application, by reading hypertext and other related programming code and displaying corresponding text and graphics, allows virtually anyone interested in using the Internet to use this amazing tool easily and simply. One of the most used and familiar aspects of Internet browsers is the ability to click on a hyperlink in a hypertext environment and follow the link to additional hypertext. A hyperlink is a connection between an element in a hypertext document, such as a word, a phrase, a symbol, or an image, and a different element in the document, another document, a file or a script. The user activates the link by clicking on the linked element, which is usually underlined or in a color different from the rest of the document to indicate that the element is linked. Without hyperlinks, the Internet could not be utilized by users with the ease, simplicity and speed that it is today. Hyperlinks are an inextricable part of the Internet browsing experience, and will be for the foreseeable future.

Hyperlinks are utilized to navigate through hypermedia. Hypermedia is the combination of text, video, graphic images, sound, hyperlinks, and other elements in the form typical of web documents and interactive software, media and games. Hyperlinks and hypertext have changed the way information is delivered and consumed by users. However, due to the vast complexity of the Internet and/or electronic documents and files, giving users the constant ability to follow hyperlinks from one page to another (while giving users great benefit) often results in users losing their train of thought and getting lost in the billions of possible pages, documents, and/or files available, reducing their ability to extract the information they are looking for. For example, lets say a user has delved deeply into a web site about automobiles. Usually, each page is filled with hyperlinks offering the user other places to go related to cars, some within the current web site, some that will take the user to other related web sites. Now the user is faced with a decision. Which hyperlink to chose? It's important, because if he selects one that eventually takes him to a place he really wasn't interest in going, it's often difficult to get back to the original page from which he left. While there are some ways to minimize this problem using modern browsers, and opening additional windows, there is no easy way to prevent the users from losing their train of thought or simply "getting lost" while clicking hyperlinks. This also translates to a waste of time (and money for commercial users) and energy for users and an often inefficient method of browsing the web.

Anyone that has followed the evolution of the Internet over the last five years knows that the Internet of 1996 bears little resemblance to the Internet of the year 2000. Today's Internet is bolder, more graphical, faster and largely multimedia based. As a result, the user has more opportunity to become lost or removed from the web document he started his viewing with or a web document that arose in the middle of his researching. In addition, some web documents may contain multiple hyperlinks that the user may wish to visit, but is unable to efficiently achieve the desired outcome because the user is constantly transferred away from the current web document. As such, there is a need for increased functionality in hypertext documents containing hyperlinks to allow a user to effectively and efficiently proceed through desired information and hyperlinks.

SUMMARY OF THE INVENTION

Accordingly, the present invention provides methods and software which overcome one or more disadvantages of the prior art.

The present invention solves this problem by providing additional options upon designation of a hyperlink wherein at least one of the additional options has non-linking functionality. One aspect of the present invention is a method of operating a computer system. The method comprises: providing a visual display; displaying digital content in a first window on the visual display, the digital content including a hyperlink, wherein the hyperlink comprises computer program code; providing a graphical interface on the visual display that is operative to effectuate a designation of a hyperlink; and visually generating a plurality of user selectable options on the visual display in response to the designation of the hyperlink, wherein the user selectable options comprise at least one option with non-linking functionality.

Another aspect of the present invention is a computer software program comprising computer executable instructions for altering or constructing hypertext documents containing hyperlinks, wherein the hyperlink is encoded to have a plurality of user selectable options when displayed by a graphical user interface and wherein the user selectable options comprise at least one option with non-linking functionality.

Still other advantages and novel features of the present invention will become apparent to those skilled in the art from the following detailed description which is simply by way of illustration various modes contemplated for carrying out the invention. As will be realized, the invention is capable of other different obvious aspects, all without departing from the invention. Accordingly, the drawings and description are illustrative in nature and not restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 6 illustrates further details of the computer system illustrated in FIG. 5;

FIG. 7 provides a function block diagram for a hyperlink enhancement device of the present invention;

FIGS. 10A and 10B illustrate sample search results from a search using the hyperlink enhancement shown in FIGS. 8 and 9;

DETAILED DESCRIPTION OF THE INVENTION

Figure 1:
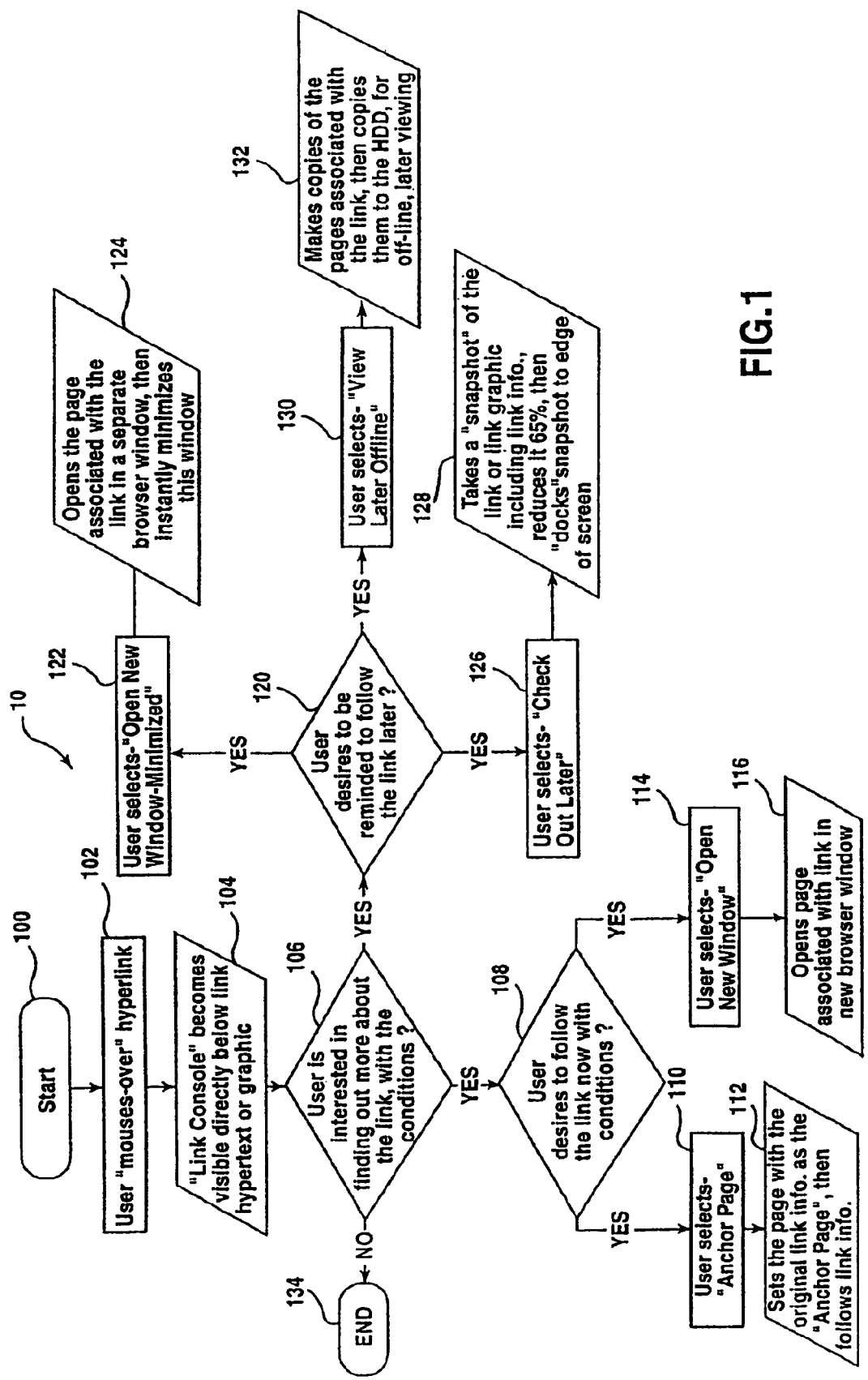
FIG. 1 illustrates an exemplary functional flow chart for the present invention.

Reference will now be made in detail to various embodiments of the invention, examples of which are illustrated in the accompanying drawings, wherein like numerals indicate similar elements throughout the views.

The following definitions apply to this disclosure and the appended claims:

DEFINITIONS toolbar—in an application having a graphical user interface, a row, column or block of on-screen buttons or icons.
hypertext page—any web page, electronic document, file, screen display, or other location a user may access with a hyperlink.
browser—any application that permits a user to view a hypertext page containing hyperlinks and to navigate within the page or to another page by utilizing hyperlinks.
function/code—any subroutine, executable file, applet, servlet, plug-in, active x-control, or other executable software and/or script.

The software platform for developing a Multifunction Hyperlink (MFHL) is designed to enable web page designers and other users to create MFHL by use of a Graphic User Interface (GUI) that contains building block applets and graphics manipulation that enables building MFHL without prior program knowledge. The end results are Multifunction Hyperlinks represented most commonly, but not limited to, on the users' computer screen in a graphical metaphor that is often referred to as a "toolbar". This toolbar can be graphically represented in a variety of designs, sizes and color schemes without reducing or enhancing the actual functionality of the Multifunction Hyperlink. Furthermore, the Multifunction Hyperlink creation software is designed in a manner that allows individual web site designers to change the graphical look and feel of the Multifunction Hyperlink to closely match the colors and theme of their individual web sites, or for any other reason without changing Multifunction Link functionality. This is to enable a Multifunction Hyperlink to seamlessly integrated into any web site, without detracting from the user experience.

In one embodiment of the present invention, a toolbar may be designed to appear when a user "mouses-over" a hyperlink. Alternatively, the toolbar may display with the page or the toolbar may appear when the cursor or pointer is in a predetermined area around the hyperlink. Preferably the toolbar is presented to the user instantly on mouse-over, or after the user keeps the mouse pointer on the hyperlink (or banner ad) for a predetermined time, for example one to three seconds. In another embodiment of the present invention, the toolset can also be added to the "right mouse click" menu. In a further embodiment, a short time delay is added before displaying the toolbar which prevents the browser from becoming jumbled with too much information if the user simply desires to click through on any given hyperlink.

Once the toolbar is in view the user is presented with a number of options. At least one of the options comprises non-linking functionality. Exemplary options allows the user to look at the content later, rather than lose a train of thought.

In another embodiment of the present invention, a software program enables users (such as web designers) to develop their additional user selectable options to be displayed on the toolbar. In addition, the software program allows the user to select the desired appearance of the toolbar. The following paragraphs describe exemplary user selectable options that can be displayed on the toolbar for a designated hyperlink.

"Temporarily Store Hyperlink and/or Associated Image Viewing" in List for Later

This feature takes a "snapshot" of the hyperlink (including its link information), capturing a copy of any hyperlink, including a string, graphic or banner advertisement (may shrink graphics to 35% of their original size) and may then "dock it" (a function that attaches the graphic to the edge of the operating systems desktop) to the edge of the computer screen. This now docked graphic can be moved to any location on the screen the user desires, in order to take full advantage of viewable area. It has the capability to dock several hyperlinks (text, graphics or banners) stacked on top of each other. Each of these docketed hyperlinks, since they still contain all of their original hyperlink code information, can be activated and clicked through at any given time by the user, or deleted from the screen at any time. The system also enables the user to automatically delete these docked hyperlinks at time intervals that the user can select.

"Open the Hyperlinked Page in a Window and Minimize Window to the Taskbar"

When this feature is selected from the toolbar, the user only views a new item residing in the "taskbar" (a graphical element used by operating systems to let users see which applications are currently running the desktop) that references the web page connected to the hyperlink selected. This new item is actually a hypertext page corresponding to the chosen hyperlink, so selecting this feature will enable users to view the page referenced by the hyperlink at any given time in the session the user chooses, simply by clicking on the icon labeling it (thus making this new page the active, visible page on the desktop) in the taskbar of the operating system in use.

"Anchor (Remember) the Current Page (URL)"

This feature enables users to "anchor" the page they are currently visiting. This means the toolbar will store the current page's address in memory and attach this address to a small graphical element or icon, which will "dock" on the edge of the computer screen, which will be the user's "anchor". Then the user can click through on a hyperlink, explore anywhere on the Internet or other hyperlinked media they desire, then when they are ready to return to the page of origination, or anchor page, they simply click on the "anchor" icon to be presented with the page that originally contained the hyperlink that began the exploration.

"Open the Hyperlinked Page in a New Browser Window at a Predetermined and/or Smaller Size than the Original Window"

This feature enables users to click through on a hyperlink, which will present the hypertext page referenced by the hyperlink in a new window. This new browser window can have a predetermined size, which is configurable by the user or the web designer. This enables users to view the page referenced by the hyperlink while keeping the original web page visible in the background for instant re-visiting.

"Save the Hyperlinked Page for Later Viewing Off-Line"

This feature, invisibly to the user, saves the pages referenced by the hyperlink to the users hard drive for later viewing at the users discretion. In one embodiment, the user is asked what folder or directory in which to store the hypertext page. In another embodiment, the hypertext page is stored in a predetermined folder or directory. This is beneficial to any user, but particularly to users with slow connections to a network. This feature enables users to see what the hyperlink would have presented to them while they were on-line, even if the user doesn't have a live network connection at the time of this later viewing, because the hypertext pages are saved to the user's computer readable medium, such as a hard drive.

In one embodiment, the present invention may be provided through an application or subroutine running as part of or in concert with a browser. Alternatively, in another embodiment a JAVA applet, servlet, script, or embedded program can provide the code to generate the toolbar and user selectable options.

Figure 2:
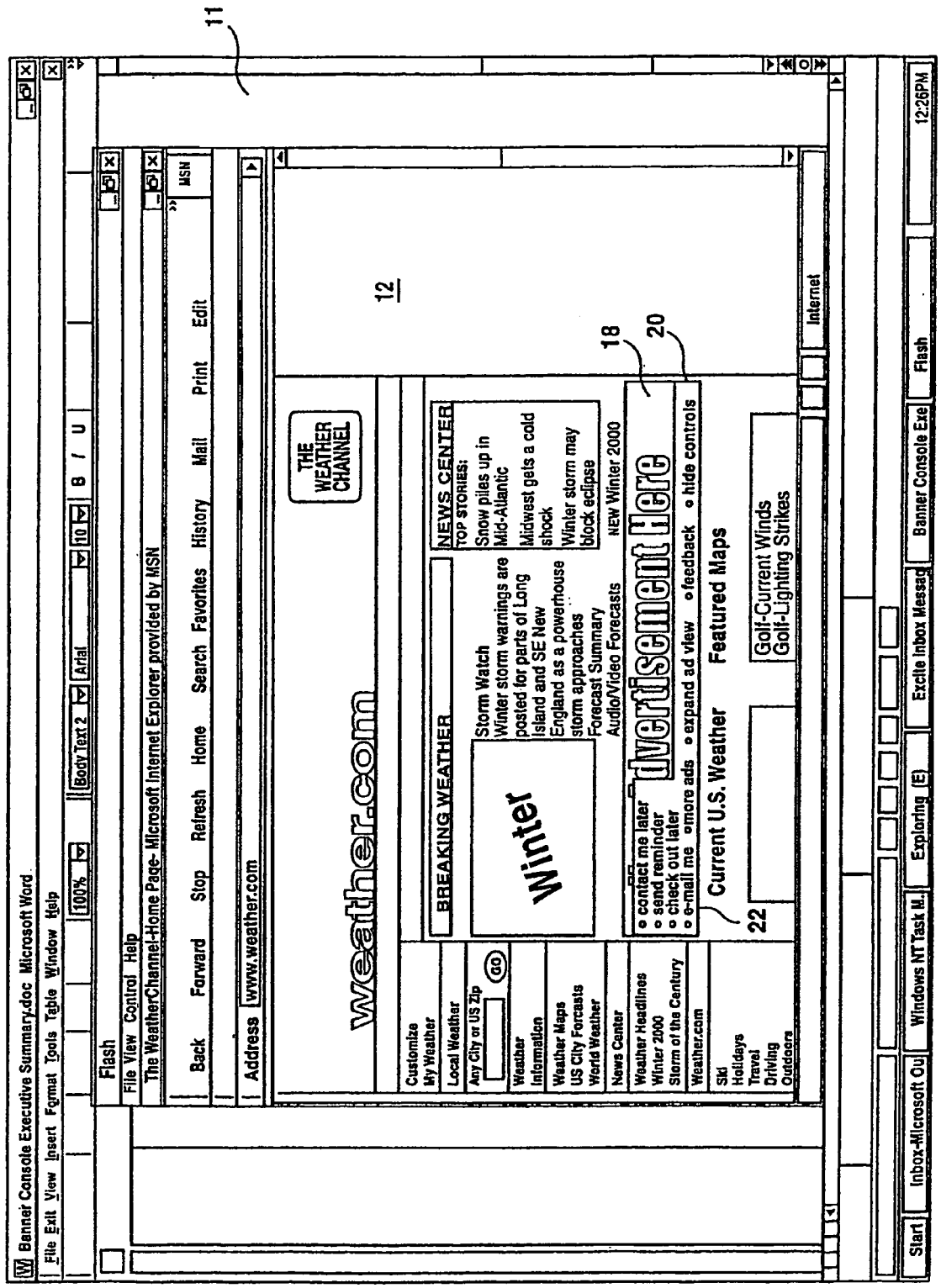
FIG. 2 illustrates a sample toolbar that may be displayed by the invention of FIG. 1.

FIG. 1 illustrates an exemplary flow chart for an exemplary embodiment of the present invention. The illustrated functional flow chart begins at Start 100. At this point, a page containing one or more hyperlinks would be displayed for the user. Thereafter, the user selects a hyperlink in block 102 by moving a cursor either "over" or near a hyperlink that the user wishes to select. When the cursor is "over" or near a hyperlink, the program displays a toolbar which illustrates one or more user selectable options available for that particular hyperlink in block 104. The program may wait a period of time, for example, three seconds, after the pointer is placed "over" or near a selected hyperlink to display the toolbar. In one exemplary embodiment, the toolbar is displayed as part of or with the hyperlink. FIG. 2 illustrates one example of toolbar 20 on a stimulated hypertext page 12 on display 11. With the toolbar displayed, the user may select which option they desire to utilize, if any. Decision Block 106 represents the user selection process.

If the user does not desire to use any of the user selectable options, then the user may either click on the hyperlink and follow that link or the user may move the cursor away from the link and the toolbar may be hidden. In either case, the functional flow will terminate at end 134. With the toolbar displayed in block 104, the user may select one of the user selectable options from the toolbar. Exemplary choices are illustrated in blocks 110, 114, 122 and 126. Decision blocks 106, 108 and 120 reflect the choices that a user may make in selecting an option. Decision block 106 represents the user wanting to utilize one of the options to interact with the hyperlink. Decision block 108 represents the user's desire to follow the selected link and decision block 120 illustrates a user's desire to follow the selected link at a later time.

Decision block 120 represents the user's desire to return to the selected link at a later time without losing their current train of thought or place on the current page. Three exemplary enhancements are presented for illustration in Blocks 122, 126 and 130. For example, the user may select open new window minimized from the exemplary toolbar 20 displayed in Block 104. This selection in Block 122 causes a new browser window to be opened with the page associated with the selected link displayed in that browser window. When this browser window is opened in block 124, the window automatically is minimized so that the user may continue to view the current page with a minimum of distraction. The minimized window, however, enables the user to quickly and easily access the selected hyperlink with a single click at a later time. While current browsers enable the user to perform a similar function by right clicking on the link, however, the user is required to manually minimize this browser window. Thus, the present application enables the user to accomplish in a single click what might otherwise take three or more user actions. The more user actions taken by the user, the greater the distraction from viewing the current page.

In one embodiment, the icons and/or snapshots are placed in a window or a box so that they are conveniently placed together. Additionally, it may be desirable to integrate the check it later feature with the browser such that one of the menu items displayed and/or available for display would be the check it later feature. This integration would provide an alternative method of saving the items selected by the user to check later. Thus, when the user started the browser and selected the check it later menu item then a window with all the items selected for checking later could be displayed.

The third illustrated alternative is one where the user selects the "view later off line" link enhancement. When the user makes this selection in block 130, the enhancement makes copies of the page(s) associated with the selected link and then saves them to hard drive or other storage location for later viewing off line. In essence, the program downloads the hypertext page or pages associated with the selected link in the background while the user continues to view the current page and/or follow additional links associated with the current page. The user may be able to select the number or levels of pages to be downloaded.

The toolbar selections represented by blocks 110, 114, 122, 126 and 130 provide five examples of user selectable options.

Browser Application Interface

Figure 3:
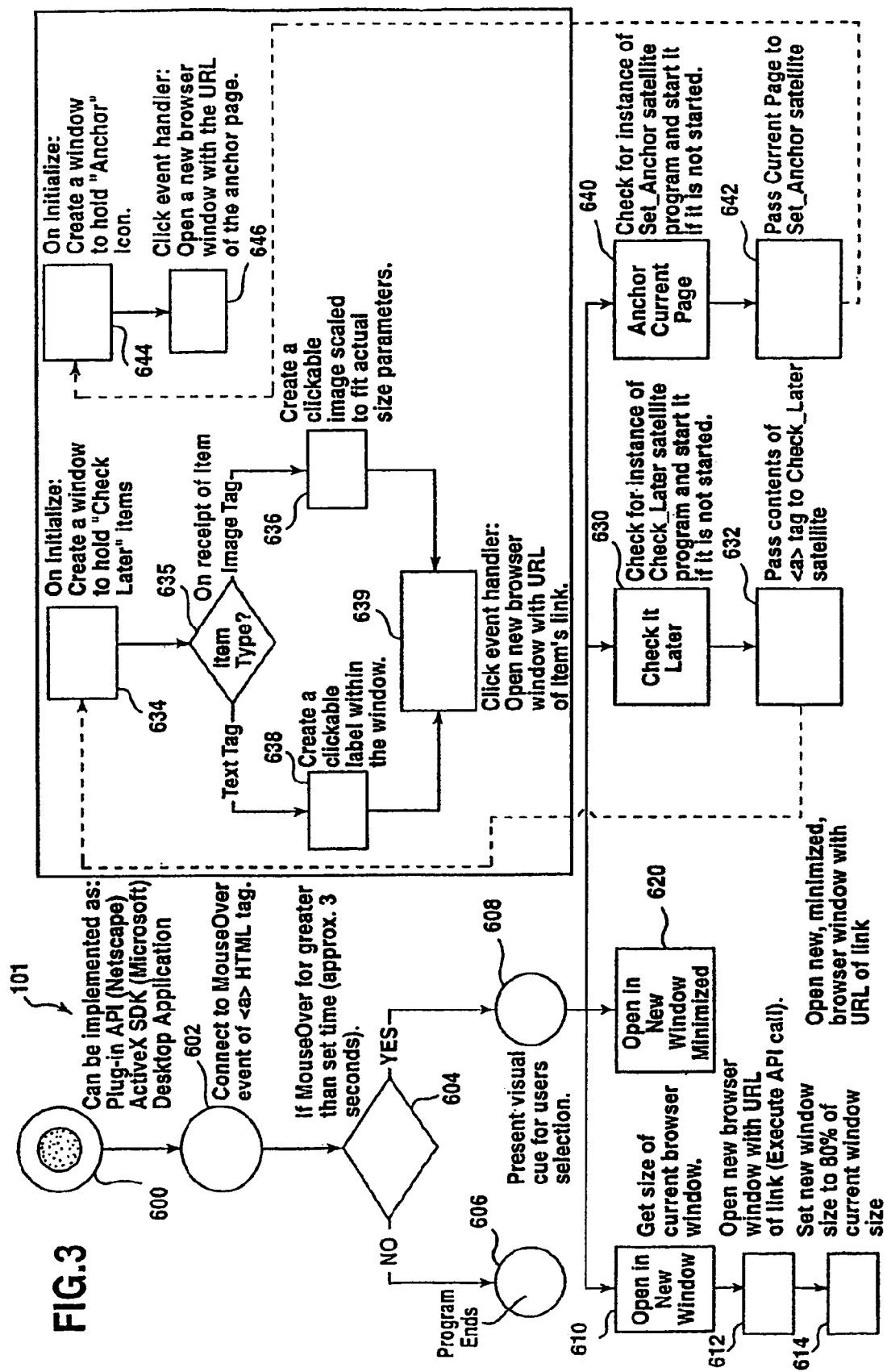
FIG. 3 provides a more detailed exemplary functional flow chart of a first embodiment of the invention of FIG. 1.
Figure 4:
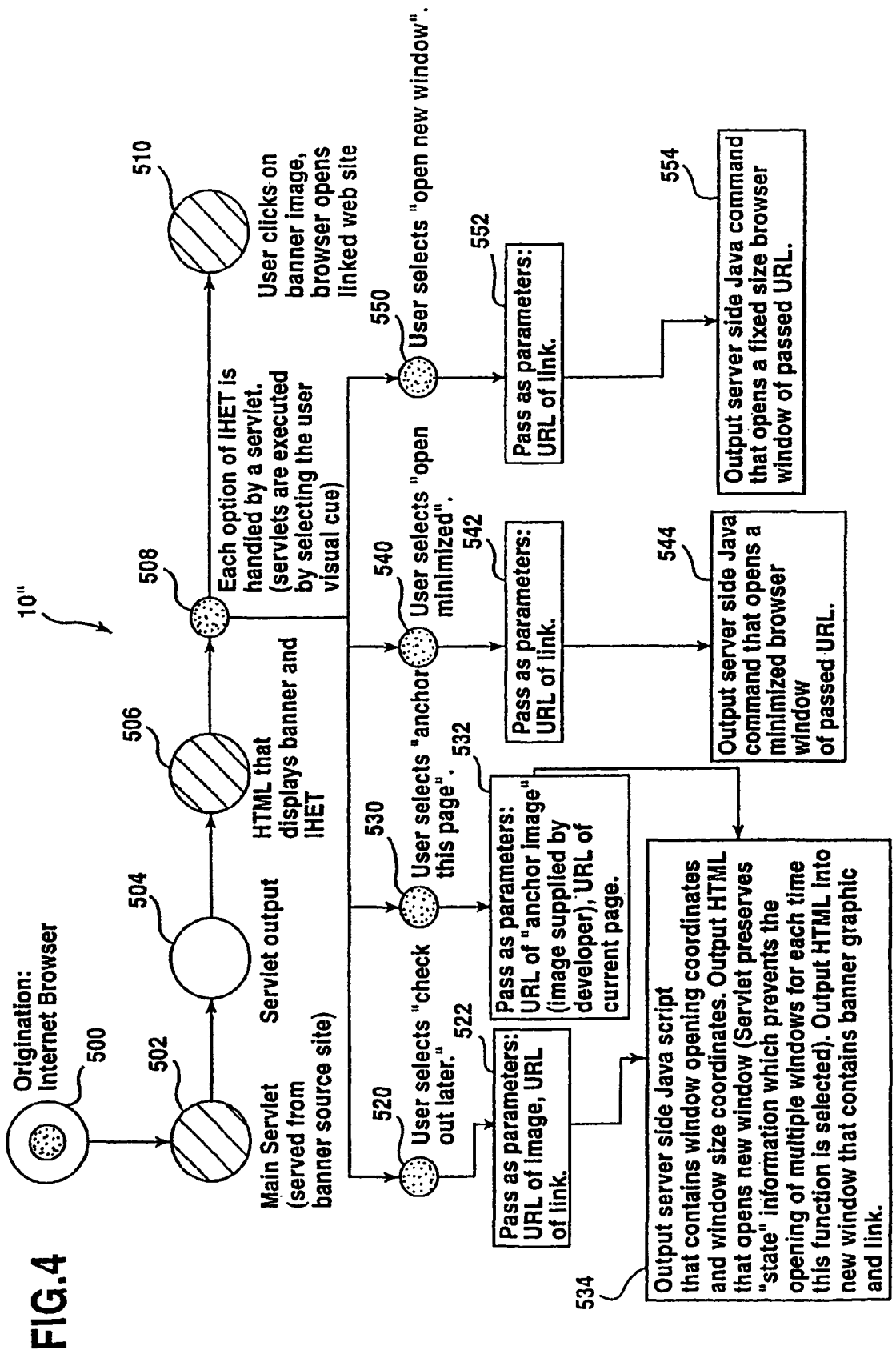
FIG. 4 shows an exemplary flow chart of a second embodiment of the invention illustrated in FIG. 1.

FIG. 3 illustrates an exemplary functional flow chart for an multifunction hyperlink code/function, such as a plug-in, that could be utilized in a browser.

A user views a hypertext page containing at least one hyperlink on a web browser 600. The plug-in contains instructions to display a toolbar on a mouse-over event for the hyperlink object in block 602.

In another embodiment, the program displays a toolbar if the user left the cursor in place near a designated hyperlink for at a set period of time, illustrated by block 604. Alternatively, the program may display a toolbar anytime the cursor is over a hyperlink. Upon detecting this occurrence, the program may override the typical (standard pre-programmed) mouse-over event with the toolbar and associated options in block 608. Alternatively, the plug-in instructions may just detect the presence of the hyperlink based on the mouse-over event and not override this event. Thereafter, the toolbar selected by the programmer is displayed. The toolbar provides one method for the user to select the particular link enhancement that the user desires to utilize. The user may decide not to utilize any of the enhancements represented by blocks 610, 620, 630 and 640 and the plug-in would end as illustrated by block 606.

When the user decides to select one of the user selectable options, flow moves through that option's starting block (610 for Open in a New Window, 620 for Open in New Window Minimized, 630 for Check it Later, and 640 for Anchor Current Page). FIG. 3 illustrates four exemplary options that may be utilized. Block 620 represents the user selecting the "Open in New Window" function. Thereafter, the illustrated link enhancement uses Application Programming Interface (API) calls to open a new browser window and size it or place it so that it does not completely obliterate the view of the original browser window as illustrated in blocks 612 and 614.

A second function entitled "Open in New Window Minimized" begins in block 620. The illustrated link enhancement uses API calls to open a new browser window in the minimized state (so it shows up as an icon or is displayed on the system taskbar or toolbar).

The third illustrated function begins in Block 630. The "check it later" function in this implementation utilizes a satellite program to manage the hyperlinks that the user desires to save for later access. First, the function checks to see if the Check_Later satellite function is running. If the satellite function has not yet started, then it is initiated. Thereafter, the contents of the hyperlink tag are passed to the Check_Later satellite via Object Linking and Embedding (OLE) (or some other inter-process communication scheme known to one skilled in the art) in block 632. When the Check_Later satellite receives a hyperlink tag for the first time, the program creates a window to hold Check_Later items in Block 634. Thereafter, the satellite may determine if the contents of the hyperlink tag contains art and/or text in decision 635. If the item is a text tag, the program flow moves to block 638 where a clickable label is created within the window created in block 634. If the item is an image tag, the program flow moves to block 636 where a clickable image is created within the window created in block 634. The information passed in provides everything necessary for the satellite to set up a click even handler in block 639 which would launch the appropriate link in a new browser window when the user clicked on the saved hyperlink.

The function titled "Anchor Current Page" begins in block 640. In this implementation, the satellite program approach has also been utilized. For this function, the URL of the current page must be passed to the satellite as shown in block 642. This is all that the satellite needs to display an Anchor icon on the desktop in block 644 and to set up a click event handler which would reopen the current page in a new browser window when the user click on the anchor icon as illustrated in block 646.

Figure 5:
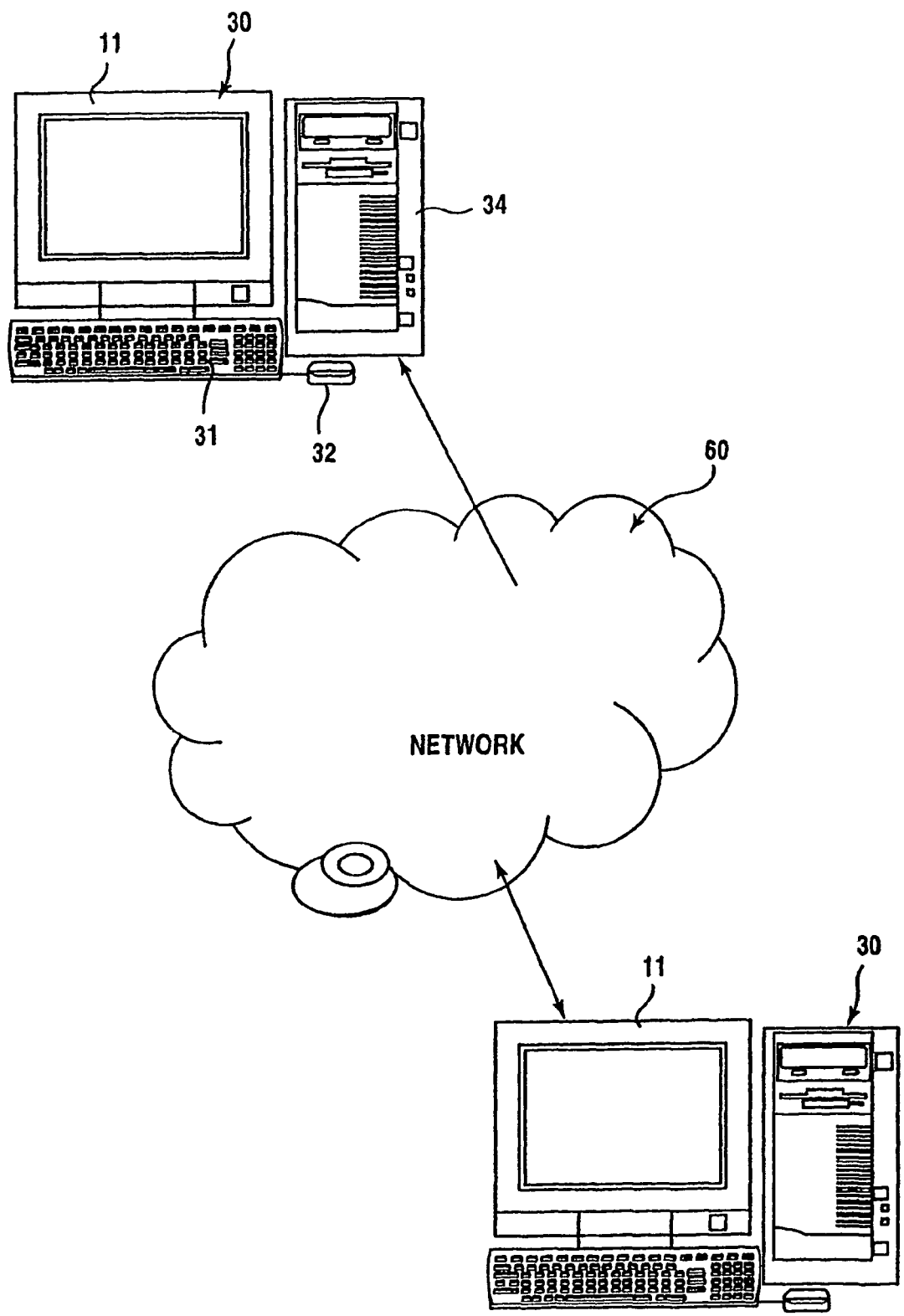
FIG. 5 illustrates a computer utilizing the hyperlink enhancement operating on a network.

The hyperlink enhancement function may operate on a computer 30 (FIG. 5). Computer 30 may be a personal computer (PC) or a server. Typically, computer 30 has a display 11, keyboard 31, and pointing device 32 connected to CPU 34. Computer 30 may be connected to a network 60 that contains hyperlinked pages or may be a stand-alone system.

The CPU 34 typically contains a microprocessor 36, and RAM 38 (FIG. 6). Some CPU's also have some form of mass storage 40, for example a hard drive, CDROM, or DVD. The computer 30 becomes a hyperlink enhancement device 10 when the hyperlink enhancement function is executed. This device 10 has a hyperlink detector 70 and a display system 71. The display system 71 may have a display controller 72 and a display 11. The hyperlink detector 70 may be formed from CPU 34 or microprocessor 36 running a hyperlink enhancement code/function 10, such as a browser plug-in. When the detector 70 detects the presence of a hyperlink near the location provided by cursor 74, the detector 70 sends a toolbar display signal 73 to the display controller 72. Upon receipt of a toolbar display signal 73 the display controller 72 sends a signal to the display 11 to display toolbar 20. The displayed toolbar containing at least one hyperlink enhancement that the user may select. Cursor 74 may be a keyboard 31, a mouse, track bal, or other pointing device 32.

Other Enhancements

This invention provides a platform for many enhancements to the current hyperlink. Several potential enhancements are outlined below. It is expected that these and other hyperlink enhancements could be programmed by a programmer of ordinary skill in the art given this disclosure.

"E-mail more information". This feature, would prompt for e-mail address and allow advertisers to send more information to users who express interest in this way. This way a user can gather more information without necessarily having to follow the link.

"Statistical Information". This feature, would allow advertisers to track statistics related to how, how much, when and under what circumstances their advertisements were being utilized.

"Sweepstakes Information". This feature would allow advertisers to add "sweepstake" entry information to the "toolbar" enabling users to enter the sweepstakes without losing their train of thought.

Figure 8:
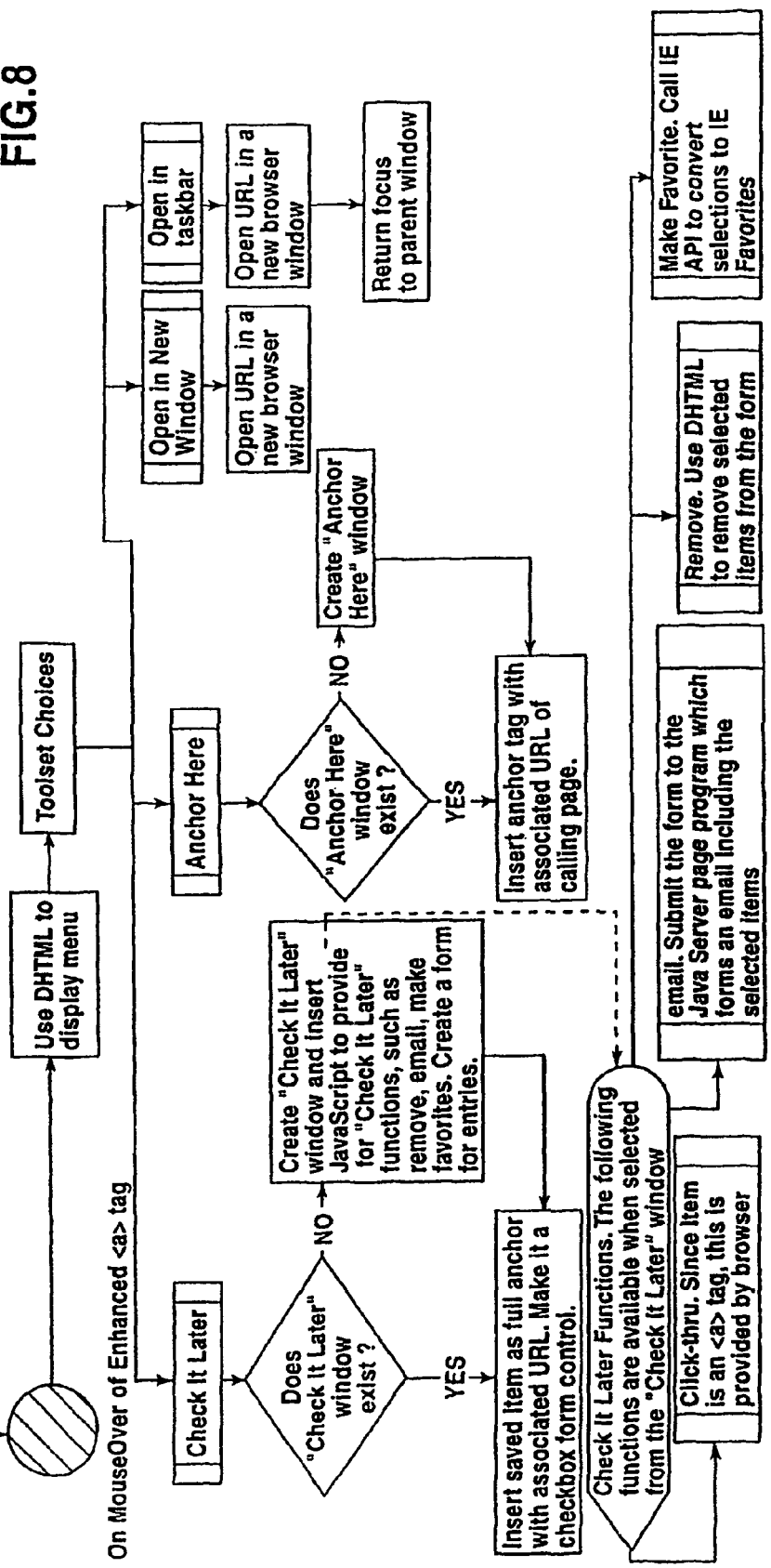
FIG. 8 shows an exemplary flow chart of a third embodiment of the invention illustrated in FIG. 1.

FIG. 8 illustrates additional exemplary user selectable options of the present invention. In order to implement the exemplary enhanced features, the "Check it Later" (my list) window may be formatted as an HTML form where the "Check it Later" item(s) are placed on that form as HTML CheckBox items. This provides an interface for the user to be able to select one or all of the items for further processing. FIGS. 10A and 10B illustrate a "my list" window 800 that has the features of the "Check it Later" window. These two terms can be considered interchangeable. The current options for further processing are described below.

E-mail Links:

This Submit button the form calls a custom Java Server Page program which compiles all selected items into the text portion of an e-mail message. The user is presented with a browser window containing another form with fields for entering their e-mail address, the address of the recipient, the subject of the e-mail and any additional message they might want to add. A "Send" button on the page submits this form to another Java Server Page program which sends the message via SMTP.

Deleting Links:

JavaScript subroutines are added to the "Click it Later" window when it is created which utilize DHTML to remove checked items when the user clicks on the "Delete" button.

Make Links into Internet Explorer Favorites:

JavaScript subroutines are added to the "Click it Later" window when it is created. When the user clicks on the "Make Favorites" button these programs utilize DHTML to retrieve the content of checked items and call the "AddFavorite" Windows API routine to allow the user to add each item to their Internet Explorer favorites.

Figure 9:
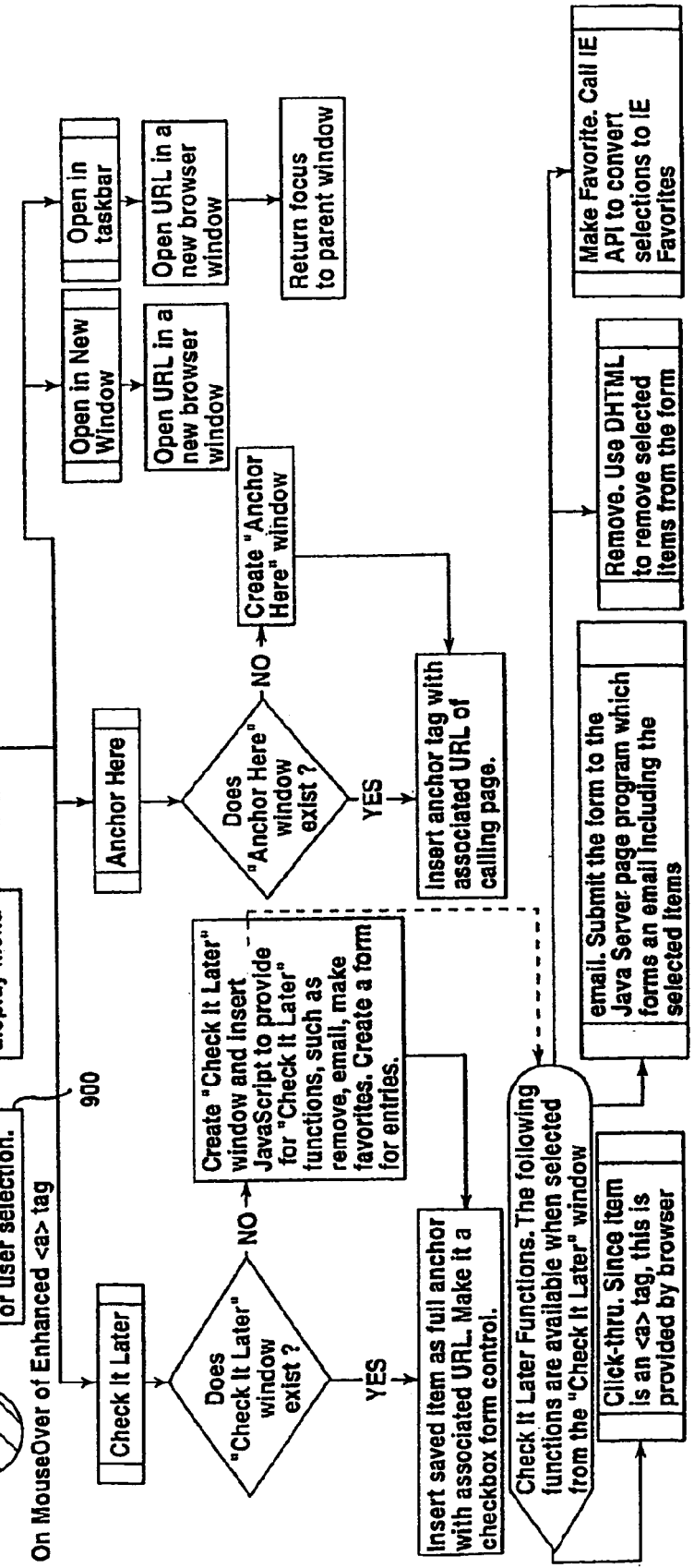
FIG. 9 illustrates an exemplary flow diagram for a fourth embodiment of the invention illustrated in FIG. 1.
Figure 11A:
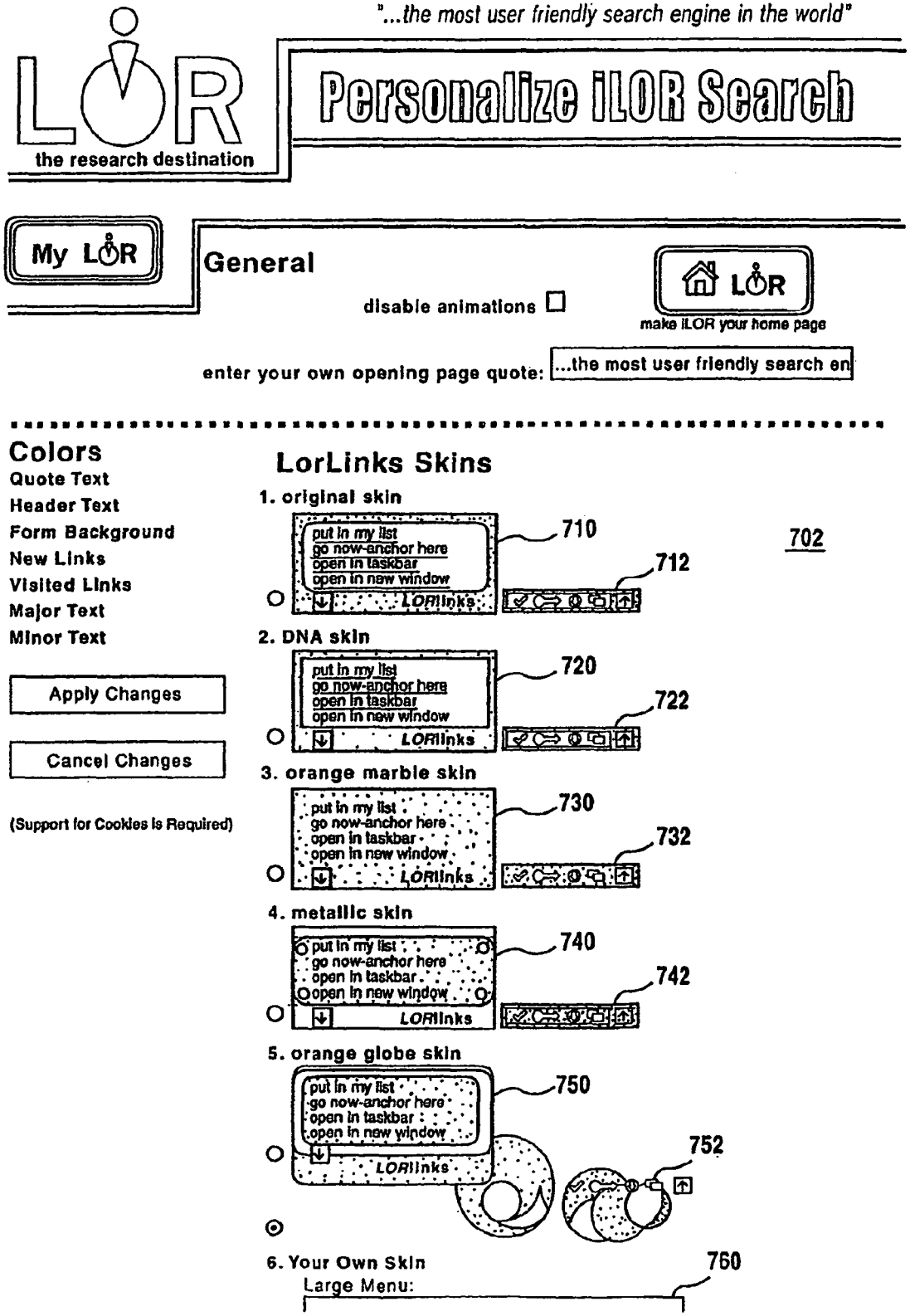
FIGS. 11A and 11B show a sample screen where a user may customize the hyperlink enhancement shown in FIG. 9.

FIG. 9 illustrates another embodiment of the current invention. This embodiment adds the ability to change the skin or background image for the menu that allows the user to access the multifunction hyperlink features. The addition is represented by block 900. In block 900 the program could use and/or inset a default skin, a user selected skin, or an advertising/banner skin. The default skin could be any skin selected or created by the programmer. An exemplary skin 710, 712 for the large and small menus respectively are shown in FIG. 11A.

Figure 11B:
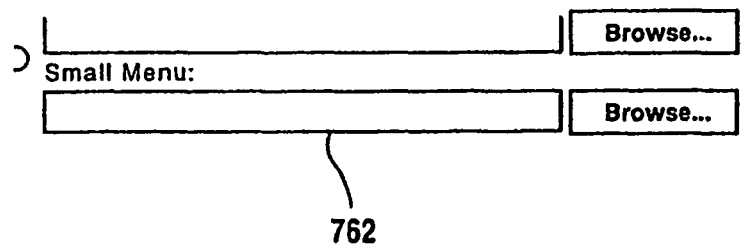
Figure 12:
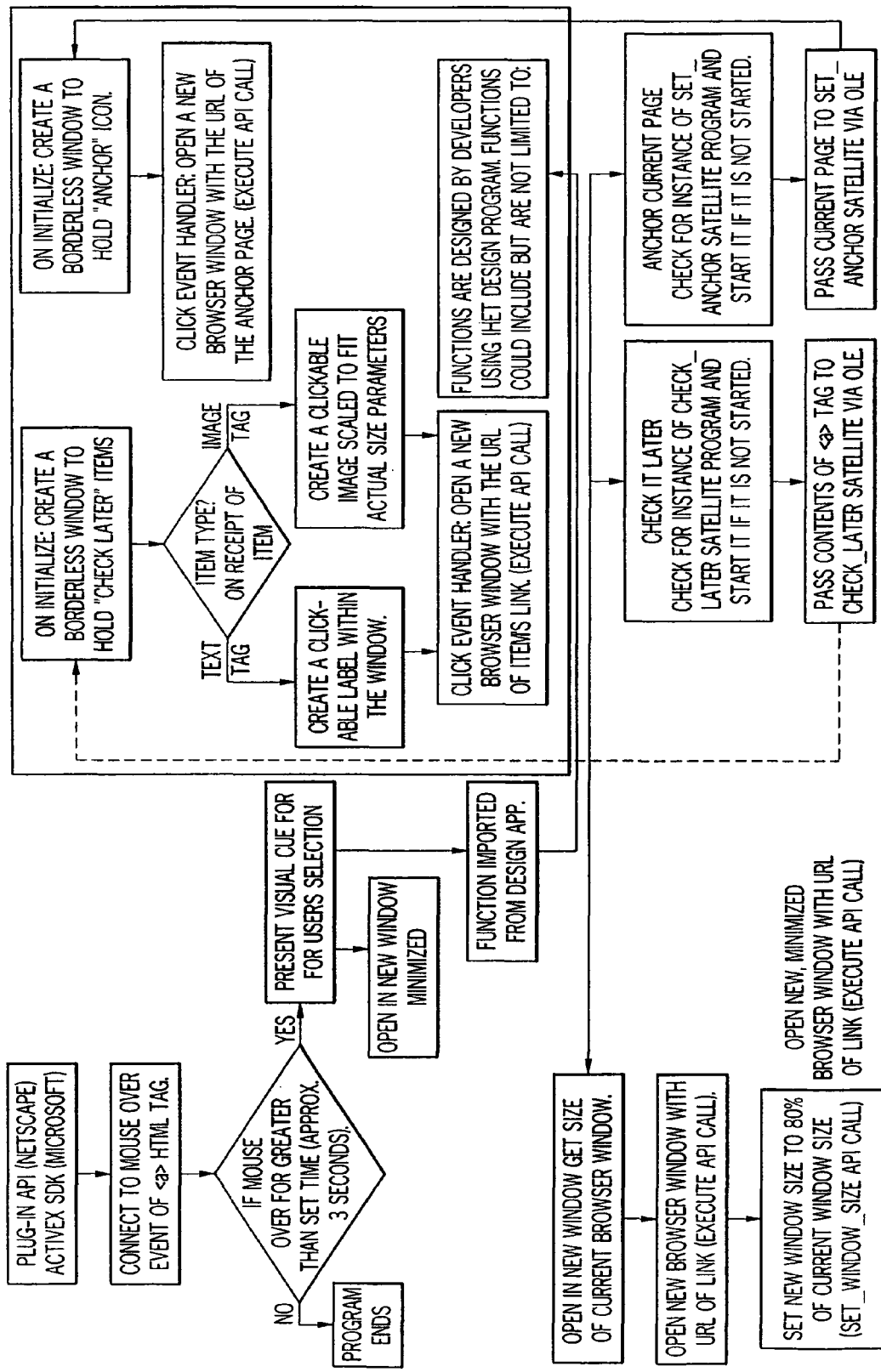
FIGS. 12 and 13 illustrate exemplary functional flowcharts for additional embodiments for the present invention.
Figure 13:
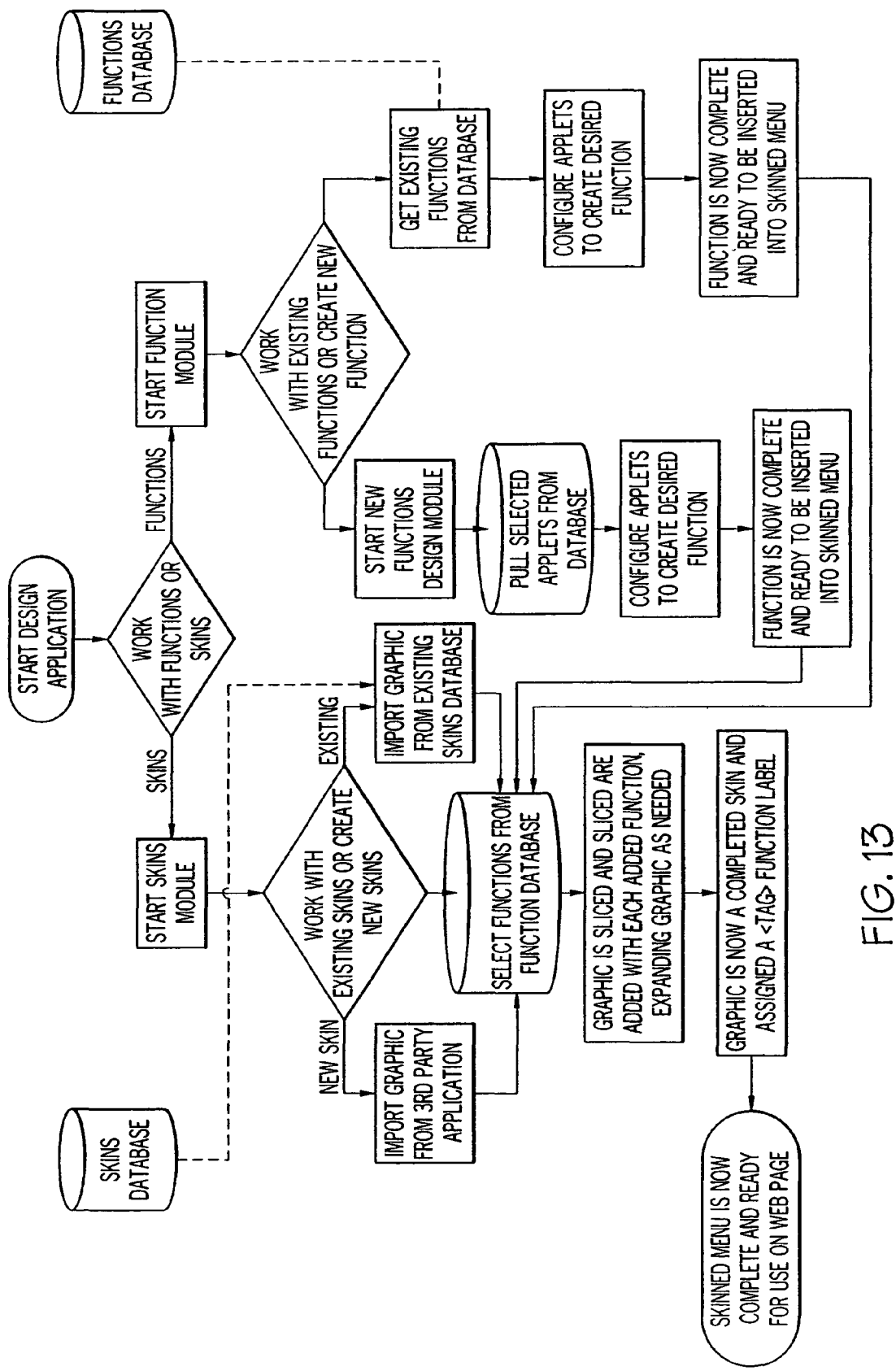
Figure 14:
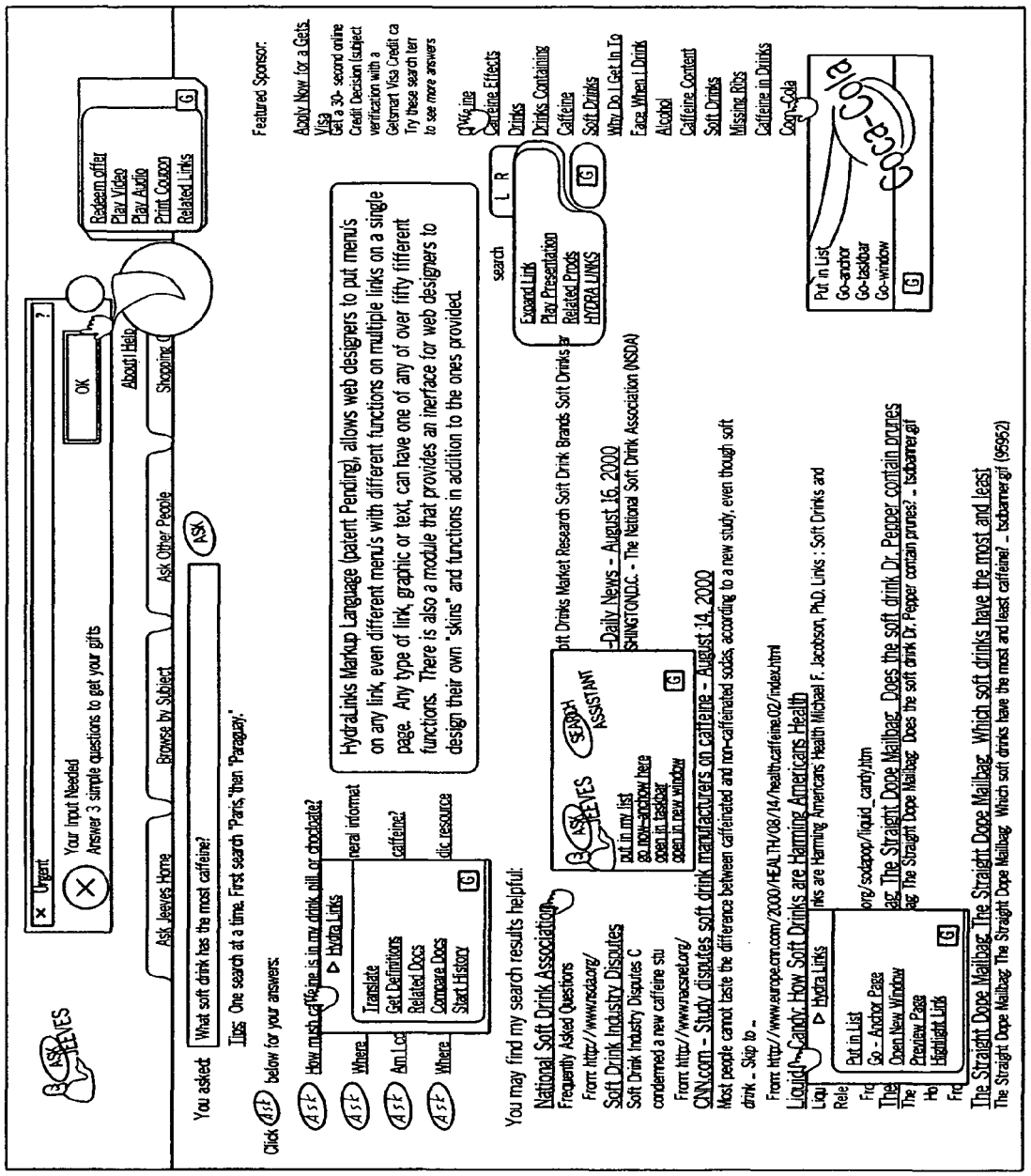
FIG. 14 illustrates a sample screen capture illustrating exemplary multifunction hyperlinks produced by the invention illustrates in FIGS. 12 and 13.

The user may select a skin through any number of graphic user interfaces created by the programmer. An exemplary interface 702 is illustrated in FIGS. 11A and 11B. The interface shown is accessed by selecting hyperlink 700 shown on FIG. 10A. Other methods of providing the user access to an interface are well known in the art. Interface 702 provides the user the ability to select a skin from a group of skins provided by the programmer. Examples of large menu skins 720, 730, 740, and 750 are provided in FIG. 11A. Similarly, examples of small menu skins 722, 732, 742, and 752 are also provided in FIG. 11A. Alternatively, the user may select their own skin or image for both large and small menus using text boxes 760 and 762 respectively.

When the embodiment shown in FIG. 9 is used in conjunction with a search engine to search a web site or the Internet, the site owner or an advertiser may desire to inset a skin related to the search term entered. For example, if a user searching the Internet used the search term "realtor", then a skin (banner advertisement) for a particular realty office or related web site could be displayed. If the user were searching a specific site, for example a camera manufacturer, and used the search term "SLR", then the skin could display an image of a single lens reflex camera manufactured/sold by the camera manufacturer. Additionally, the skin could change after a pre-selected time period so that the manufacturer could display their entire SLR product line to the user as they reviewed the search results. Furthermore, the skin could change to reflect the product referenced by or related to the link that the user's pointer was over. For example, if the search results displayed links to product pages, product reviews, and/or press releases, then an image of the associated product could be displayed as the skin by correlating the product image/skin with the link using a database. The display of an image related to the link could allow the user to quickly determine which links had the most interest.

In summary, numerous benefits have been described with results from implying the concepts of the invention. The foregoing description of the exemplary embodiments of the invention has been prepared for the purposes of illustration and description. It is not intended to be exhausted or to limit the invention to the precise form disclosed. Obvious modifications and variations are possible in light of the above teaching. The embodiment was chosen and described in order to best illustrate the principals of its invention in its practical application to thereby enable one of ordinary skill to best utilize the invention of various embodiments and with various modifications as they are suited to the particular to which is contemplated. It is intended that the scope of the invention be defined by the claims appended hereto.

What is claimed:

1. A non-transitory computer readable medium storing executable instructions for execution by a computer having a display and memory, the medium storing instructions for:
providing a user-selectable option for a toolbar on the computer, the toolbar being viewable on the display in a first window of an application in response to a user selection of a selected hyperlink contained in the first window, wherein the selected hyperlink is associated with a uniform resource locator (URL) and a page, wherein the user-selectable option is adapted to display on the display a link snapshot based on the hyperlink;
receiving an indication on the computer of a second user selection of the user-selectable option; and
as a result of the second user selection,
storing in the memory of the computer a displayable element and the URL associated with the selected hyperlink on the computer;
displaying a link snapshot on the display, wherein the link snapshot comprises the stored displayable element and is associated with the stored URL.

2. The computer readable medium of claim 1, wherein the medium comprises one of:
a hard drive;
a compact disc read-only memory (CD-ROM);
a digital versatile disk (DVD); or random access memory (RAM).

3. The computer readable medium of claim 1, wherein the user selection is provided by at least one of:
a mouse right-click;
a mouse;
a keyboard;
a touchpad;
a trackball; or
a pointing device.

4. The computer readable medium of claim 1, further comprising:
displaying on the computer, the page in response to a third user selection of the link snapshot, the page displayed using the stored URL.

5. The computer readable medium of claim 1, wherein storing the displayable element further comprises:
reducing the size of the stored displayable element.

6. The computer readable medium of claim 1, wherein the link snapshot is displayed at an edge of a display displaying the first window.

7. The computer readable medium of claim 1, further comprising:
displaying the page in a second window upon the third user selection of the link snapshot.

8. The computer readable medium of claim 1, further comprising:
retaining the link snapshot when the first window is closed.

9. The computer readable medium of claim 1, wherein the storing and the displaying the link snapshot are performed by a second application.

10. The computer readable medium of claim 1, wherein the displayable element comprises a graphic element.

11. The computer readable medium of claim 1, wherein the displayable element comprises a text element.

12. A computer for hyperlink enhancement, comprising:
a central processing unit (CPU) having memory storing CPU-executable instructions for hyperlink enhancement;
a pointing device coupled to the CPU to receive a first user selection and a second user selection;
a display coupled to the CPU to display a first-window of an application, wherein the first window contains a selected hyperlink associated with a uniform resource locator (URL) and a page;
wherein the CPU displays a user-selectable toolbar option in the first-window on the display in response to the first user selection of the selected hyperlink received by the pointing device according to the CPU-executable instructions for hyperlink enhancement, wherein the user-selectable toolbar option is adapted to display on the display a link snapshot based on the selected hyperlink;
wherein the CPU performs the following in response to the second user selection received by the pointing device according to the CPU-executable instructions for hyperlink enhancement:
storing in the memory a displayable element and the URL associated with the selected hyperlink, and
displaying a link snapshot on the display, wherein the link snapshot comprises the stored displayable element and is associated with the stored URL.

13. A method for hyperlink enhancement, comprising:
providing a user-selectable option for a toolbar on a computer having a display and memory, the toolbar being viewable on the display in a first window of an application in response to a user selection of a selected hyperlink contained in the first window, wherein the selected hyperlink is associated with a uniform resource locator (URL) and a page, wherein the user-selectable option is adapted to display on the display a link snapshot based on the selected hyperlink;
receiving an indication on the computer of a second user selection of the user-selectable option; and
as a result of the second user selection,
storing in the memory of the computer a displayable element and the URL associated with the selected hyperlink on the computer;
displaying a link snapshot on the display, wherein the link snapshot comprises the stored displayable element and is associated with the stored URL.

14. A non-transitory computer readable medium storing executable instructions for execution by a computer having a display and memory, the medium storing instructions for:
providing a user-selectable option for a toolbar on the computer, the toolbar being viewable on the display in a first page in a first window of an application in response to a user selection of a selected hyperlink in the first page, wherein the first page is associated with a first uniform resource locator (URL), wherein the selected hyperlink is associated with a second URL and a second page, wherein the user-selectable option is adapted to display on the display an icon based on the first URL;
receiving an indication on the computer of a second user selection of the user-selectable option;
as a result of the second user selection,
storing in the memory of the computer the first URL associated with the first page on the computer; and
displaying an icon on the display, the icon associated with the stored first URL.

15. The computer readable medium of claim 14, wherein the medium comprises one of:
a hard drive;
a compact disc read-only memory (CD-ROM);
a digital versatile disk (DVD); or random access memory (RAM).

16. The computer readable medium of claim 14, wherein the user selection is provided by at least one of:
a mouse right-click;
a mouse;
a keyboard;
a touchpad;
a trackball; or
a pointing device.

17. The computer readable medium of claim 14, further comprising:
displaying the first page in response to a third user selection of the icon, the page displayed using the stored URL.

18. The computer readable medium of claim 14, wherein the icon is displayed at an edge of a display displaying the first window.

19. The computer readable medium of claim 14, wherein the icon is displayed as a button in the toolbar.

20. The computer readable medium of claim 14, wherein the storing and displaying are performed by a second application.

21. The computer readable medium of claim 14, further comprising:
displaying the first page in a second window upon the second user selection of the icon.

22. A computer for hyperlink enhancement, comprising:
a central processing unit (CPU) having memory storing CPU-executable instructions for hyperlink enhancement;
a pointing device coupled to the CPU to receive a user selection of a selected hyperlink and a second user selection;
a display coupled to the CPU to display a first page in a first window of an application, wherein the first page is associated with a first uniform resource locator (URL) and the first page contains the selected hyperlink, wherein the selected hyperlink is associated with a second URL and a second page;
wherein the CPU displays a user-selectable toolbar option in the first window on the display in response to the user selection of a selected hyperlink received by the pointing device according to the CPU-executable instructions for hyperlink enhancement, wherein the user-selectable option is adapted to display on the display an icon based on the first URL;
wherein the CPU performs the following in response to the second user selection received by the pointing device according to the CPU-executable instructions for hyperlink enhancement:
storing in the memory the first URL associated with the first page, and
displaying an icon on the display, wherein the icon associated with the stored first URL.

23. A method for hyperlink enhancement, comprising:
providing a user-selectable option for a toolbar on a computer having a display and memory, the toolbar being viewable on the display in a first page in a first window of an application in response to a user selection of a selected hyperlink in the first page, wherein the first page is associated with a first uniform resource locator (URL), wherein the selected hyperlink is associated with a second URL and a second page, wherein the user-selectable option is adapted to display on the display an icon based on the first URL;

receiving an indication on the computer of a second user selection of the user-selectable option;

as a result of the second user selection,
storing in the memory of the computer the first URL associated with the first page on the computer; and
displaying an icon on the display, the icon associated with the stored first URL.

24. A non-transitory computer readable medium storing executable instructions for execution by a computer having a display and memory, the medium storing instructions for:
providing a user-selectable option for a toolbar on the computer, the toolbar being viewable on the display in a first page in a first window of an application in response to a user selection of a selected hyperlink in the first page, wherein the first page is associated with a first uniform resource locator (URL), wherein the selected hyperlink is associated with a second URL and a second page, wherein the user-selectable option is adapted to display on the display a graphical element based on the first URL;
receiving an indication on the computer of a second user selection of the user-selectable option; and
as a result of the second user selection,
storing in the memory of the computer the first URL associated with the first page on the computer; and
displaying a graphical element on the display, the graphical element associated with the stored first URL.

25. The computer readable medium of claim 24, wherein the medium comprises one of:
a hard drive;
a compact disc read-only memory (CD-ROM);
a digital versatile disk (DVD); or random access memory (RAM).

26. The computer readable medium of claim 24, wherein the user selection is provided by at least one of:
a mouse right-click;
a mouse;
a keyboard;
a touchpad;
a trackball; or a pointing device.

27. The computer readable medium of claim 24, further comprising:
displaying the first page in response to a third user selection of the graphical element, the first page displayed using the stored first URL.

28. The computer readable medium of claim 24, wherein the graphical element is displayed at an edge of a display displaying the first window.

29. The computer readable medium of claim 24, wherein the graphical element is displayed as a button in the toolbar.

30. The computer readable medium of claim 24, wherein the storing and the displaying the graphical element are performed by a second application.

31. The computer readable medium of claim 24, further comprising:
displaying the first page in a second window upon the second user selection of the graphical element.

32. A computer for hyperlink enhancement, comprising:
a central processing unit (CPU) having memory storing CPU-executable instructions for hyperlink enhancement;

a pointing device coupled to the CPU to receive a first user selection and a second user selection;

a display coupled to the CPU to display a first page in a first window of an application in response to a user selection of a selected hyperlink, wherein the first page is associated with a first uniform resource locator (URL), wherein the selected hyperlink is associated with a second URL and a second page;

wherein the CPU displays a user-selectable toolbar option in the first-window on the display in response to receiving the user selection of the selected hyperlink by the pointing device according to the CPU-executable instructions for hyperlink enhancement, wherein the user-selectable toolbar option is adapted to display on the display a graphical element based on the first URL;

wherein the CPU performs the following in response to the second user selection received by the pointing device according to the CPU-executable instructions for hyperlink enhancement:
storing in the memory the first URL associated with the first page on the computer, and
displaying a graphical element on the display, the graphical element associated with the stored first URL.

33. A method for hyperlink enhancement, comprising:
providing a user-selectable option for a toolbar on a computer having a display and memory, the toolbar being viewable on the display in a first page in a first window of an application in response to a user selection of a selected hyperlink in the first page, wherein the first page is associated with a first uniform resource locator (URL), wherein the selected hyperlink is associated with a second URL and a second page, wherein the user-selectable option is adapted to display on the display a graphical element based on the first URL;
receiving an indication on the computer of a second user selection of the user-selectable option; and
as a result of the second user selection,
storing in the memory of the computer the first URL associated with the first page on the computer; and
displaying a graphical element on the display, the graphical element associated with the stored first URL.

34. A non-transitory computer readable medium storing executable instructions for execution by a computer having a display and memory, the medium storing instructions for:
providing a right mouse click menu option on the computer, the right mouse click menu option viewable on the display in a hypertext page in a first window of a browser in response to a user issuing a right mouse click on a first selected hyperlink in the hypertext page, wherein the hypertext page is associated with a first uniform resource locator (URL), wherein the first selected hyperlink links to a second URL;
receiving a user selection on the computer of the right mouse click menu option;
as a result of the user selection,
storing in the memory of the computer an address associated with the hypertext page address;
enabling the computer to display a second hyperlink on the display, wherein a label of the second hyperlink is associated with the hypertext page and the second hyperlink links to the first URL associated with the hypertext page; and
enabling the computer to display the first hyperlink on the display.

35. A computer for hyperlink display, comprising:
a central processing unit (CPU) having memory storing CPU-executable instructions for hyperlink display;
a pointing device coupled to the CPU to receive a user selection of a selected hyperlink and a second user selection;
a display coupled to the CPU to display a hypertext page in a first window of a browser, wherein the hypertext page is associated with a first uniform resource locator (URL), wherein the hypertext page contains the selected hyperlink, the selected hyperlink links to a second URL;
wherein the CPU displays a right mouse click menu option in the first window on the display in response to receiving the user selection of the selected hyperlink by the pointing device according to the CPU-executable instructions for hyperlink display;
wherein the CPU performs the following in response to the second user selection received by the pointing device according to the CPU-executable instructions for hyperlink display:
storing in the memory an address associated with the hypertext page;
enabling the computer to display a second hyperlink on the display, wherein a label of the second hyperlink is associated with the hypertext page and the second hyperlink links to the first URL associated with the hypertext page; and
enabling the computer to display the first hyperlink on the display.

36. A method for hyperlink display, comprising:
providing a right mouse click menu option on a computer having a display and memory, the right mouse click menu option viewable on the display in a hypertext page in a first window of a browser in response to a user issuing a right mouse click on a selected hyperlink in the hypertext page, wherein the hypertext page is associated with a first uniform resource locator (URL), wherein the selected hyperlink links to a second URL;
receiving a user selection on the computer of the right mouse click menu option;
as a result of the user selection,
storing in the memory of the computer an address associated with the hypertext page;
enabling the computer to display a second hyperlink on the display, wherein a label of the second hyperlink is associated with the hypertext page and the second hyperlink links to the first URL associated with the hypertext page; and
enabling the computer to display the selected hyperlink on the display.

37. A non-transitory computer readable medium storing executable instructions for execution by a computer having a display and memory, the medium storing instructions for:
providing a right mouse click menu option on the computer, the right mouse click menu option viewable on the display in a hypertext page in a first window of a browser in response to a user issuing a right mouse click on a selected graphical hyperlink in the hypertext page, wherein the hypertext page is associated with a first uniform resource locator (URL);
receiving a user selection on the computer of the right mouse click menu option;
as a result of the user selection,
storing in the memory of the computer an address associated with the hypertext page;
enabling the computer to display a second hyperlink on the display,
wherein the second hyperlink links to the first URL associated with the hypertext page and a label of the second hyperlink is the first URL; and
enabling the computer to display the selected graphical hyperlink on the display.

38. A computer for hyperlink display, comprising:
a central processing unit (CPU) having memory storing CPU-executable instructions for hyperlink display;
a pointing device coupled to the CPU to receive a first user selection and a second user selection;
a display coupled to the CPU to display a hypertext page in a first window of a browser, wherein the hypertext page is associated with a first uniform resource locator (URL), wherein the hypertext page contains a selected graphical hyperlink;
wherein the CPU displays right mouse click menu option in the first window of the display in response to receiving the first user selection on the selected graphical hyperlink by the pointing device according to the CPU-executable instructions for hyperlink display;
wherein the CPU performs the following in response to receiving the second user selection received by the pointing device according to the CPU-executable instructions for hyperlink display:
storing in the memory an address associated with the hypertext page;
enabling the computer to display a second hyperlink on the display, wherein the second hyperlink links to the first URL associated with the hypertext page and a label of the second hyperlink is the first URL; and
enabling the computer to display the graphic on the display.

39. A method for hyperlink display, comprising:
providing a right mouse click menu option on a computer having a display and memory, the right mouse click menu option viewable on the display in a hypertext page in a first window of a browser in response to a user issuing a right mouse click on a selected graphical hyperlink in the hypertext page, wherein the hypertext page is associated with a first uniform resource locator (URL);
receiving a user selection on the computer of the right mouse click menu option;
as a result of the user selection,
storing in the memory of the computer an address associated with the hypertext page;
enabling the computer to display a second hyperlink on the display,
wherein the second hyperlink links to the first URL associated with the hypertext page and a label of the second hyperlink is the first URL; and
enabling the computer to display the selected graphical hyperlink on the display.

40. A non-transitory computer readable medium storing executable instructions for execution by a computer having a display and memory, the medium storing instructions for:
providing a right mouse click menu option on the computer, the right mouse click menu option viewable on the display in a hypertext page in a first window of a browser in response to a user issuing a right mouse click, wherein the hypertext page is associated with a first uniform resource locator (URL), wherein the hypertext page contains a first hyperlink, the first hyperlink links to a second URL;

receiving a user selection on the computer of the right mouse click menu option;

as a result of the user selection, storing in the memory of the computer an address associated with the hypertext page;

enabling the computer to display the first hyperlink on the display in a second window of an application;

enabling the computer to display a second hyperlink on the display in the second window, wherein the second hyperlink links to the first URL associated with the hypertext page; and enabling the computer to display a graphical element on the display, the graphical element representing the hypertext page, wherein the graphical element is displayed in the second window, and the graphical element is a hyperlink that links to the first URL associated with the hypertext page.

41. A computer for hyperlink display, comprising:

a central processing unit (CPU) having memory storing CPU-executable instructions for hyperlink display;

a pointing device coupled to the CPU to receive a first user selection and a second user selection;

a display coupled to the CPU to display a hypertext page in a first window of a browser, wherein the hypertext page is associated with a first uniform resource locator (URL), wherein the hypertext page contains a first hyperlink, the first hyperlink links to a second URL;

wherein the CPU displays a right mouse click menu option in the first window on the display in response to receiving the first user selection by the pointing device according to the CPU-executable instructions for hyperlink display;

wherein the CPU performs the following in response to receiving the second user selection by the pointing device according to the CPU-executable instructions for hyperlink display:

storing in the memory an address associated with the hypertext page;

enabling the computer to display the first hyperlink on the display in a second window of an application;

enabling the computer to display a second hyperlink on the display in the second window, wherein the second hyperlink links to the first URL associated with the hypertext page; and enabling the computer to display a graphical element on the display, the graphical element representing the hypertext page, wherein the graphical element is displayed in the second window, and the graphical element is a hyperlink that links to the first URL associated with the hypertext page.

42. A computer for hyperlink display, comprising:

providing a right mouse click menu option on a computer having a display and memory, the right mouse click menu option viewable on the display in a hypertext page in a first window of a browser in response to a user issuing a right mouse click, wherein the hypertext page is associated with a first uniform resource locator (URL), wherein the hypertext page is associated with a first uniform resource locator (URL), wherein the hypertext page contains a first hyperlink, the first hyperlink links to a second URL;

receiving a user selection on the computer of the right mouse click menu option;

as a result of the user selection, storing in the memory of the computer an address associated with the hypertext page;

enabling the computer to display the first hyperlink on the display in the second window, wherein the second hyperlink links to the first URL associated with the hypertext page; and enabling the computer to display a graphical element on the display, the graphical element representing the hypertext page, wherein the graphical element is displayed on the display in the second window, and the graphical element is a hyperlink that links to the first URL associated with the hypertext page.

\* \* \* \* \*